(12) United States Patent
Hafenrichter et al.

(10) Patent No.: US 11,529,777 B2
(45) Date of Patent: Dec. 20, 2022

(54) HOT BOND REPAIR OF STRUCTURES USING UNMANNED AERIAL VEHICLES

(71) Applicant: The Boeing Company, Chicago, IL (US)

(72) Inventors: Joseph L. Hafenrichter, Seattle, WA (US); Gary E. Georgeson, Tacoma, WA (US); James J. Troy, Issaquah, WA (US); Gregory J. Sweers, Renton, WA (US)

(73) Assignee: The Boeing Company, Chicago, IL (US)

( * ) Notice: Subject to any disclaimer, the term of this patent is extended or adjusted under 35 U.S.C. 154(b) by 410 days.

(21) Appl. No.: 16/782,331

(22) Filed: Feb. 5, 2020

(65) Prior Publication Data

US 2021/0237381 A1    Aug. 5, 2021

(51) Int. Cl.
*B29C 73/12*    (2006.01)
*B64C 39/02*    (2006.01)
(Continued)

(52) U.S. Cl.
CPC .............. *B29C 73/12* (2013.01); *B29C 73/10* (2013.01); *B64C 39/024* (2013.01); *B64D 1/02* (2013.01);
(Continued)

(58) Field of Classification Search
CPC ....... B29C 73/12; B29C 73/10; B64C 39/024; B64C 2201/027; B64C 2201/042;
(Continued)

(56) References Cited

U.S. PATENT DOCUMENTS 4,413,905 A    11/1983   Holzapfel
5,135,356 A     8/1992   Shepherd
(Continued)

FOREIGN PATENT DOCUMENTS

CN    110743737 A    2/2020
EP      3434594 A1   1/2019
(Continued)

OTHER PUBLICATIONS

Marlo Stradley, Dec. 2013, What is the best heating method for curing win turbine blades?, Powerblanket, https://www.powerblanket.com/blog/best-heating-method-curing-wind-turbine-blades/) (Year: 2013).*

(Continued)

*Primary Examiner* — Peter D Nolan
*Assistant Examiner* — Mikko Okechukwu Obioha
(74) *Attorney, Agent, or Firm* — Ostrager Chong Flaherty & Broitman, P.C.

(57) ABSTRACT

Methods and apparatus for performing repair operations using an unmanned aerial vehicle (UAV). A UAV carries a repair patch ensemble containing all repair materials (including a repair patch, a heating blanket and other ensemble materials) in a prepackaged form to the repair area. During flight of the UAV, the repair patch is vacuum adhered to the heating blanket. Vacuum pressure is also used to hold the repair patch ensemble in position on the composite surface of the structure. Then the hot bond process is enacted to bond the repair patch to the repair area. In accordance with one embodiment, the hot bond process involves heating the repair patch to adhesively bond the repair patch while applying vacuum pressure to consolidate the composite material. Then the repair patch is released from the ensemble and residual ensemble materials (heating blanket, bleeder material, and release films) are removed by the UAV.

21 Claims, 28 Drawing Sheets

(51) Int. Cl.
*B64D 1/02* (2006.01)
*B29C 73/10* (2006.01)
*C09J 5/06* (2006.01)

(52) U.S. Cl.
CPC ........... *C09J 5/06* (2013.01); *B64C 2201/027* (2013.01); *B64C 2201/042* (2013.01); *B64C 2201/108* (2013.01); *B64C 2201/12* (2013.01)

(58) Field of Classification Search
CPC . B64C 2201/108; B64C 2201/12; B64D 1/02; C09J 5/06
See application file for complete search history.

(56) References Cited

U.S. PATENT DOCUMENTS

| | | | |
|---|---|---|---|
| 5,904,165 A | 5/1999 | McLean et al. | |
| 7,398,698 B2 | 7/2008 | Griess et al. | |
| 7,617,730 B2 | 11/2009 | Georgeson et al. | |
| 7,643,893 B2 | 1/2010 | Troy et al. | |
| 7,813,888 B2 | 10/2010 | Vian et al. | |
| 7,859,655 B2 | 12/2010 | Troy et al. | |
| 8,044,991 B2 | 10/2011 | Lea et al. | |
| 8,060,270 B2 | 11/2011 | Vian et al. | |
| 8,214,098 B2 | 7/2012 | Murray et al. | |
| 8,255,170 B2 | 8/2012 | Kollgaard et al. | |
| 8,691,383 B2 | 4/2014 | Georgeson et al. | |
| 8,738,226 B2 | 5/2014 | Troy et al. | |
| 8,744,133 B1 | 6/2014 | Troy et al. | |
| 9,156,321 B2 | 10/2015 | Troy et al. | |
| 9,221,506 B1 | 12/2015 | Georgeson et al. | |
| 9,285,296 B2 | 3/2016 | Georgeson et al. | |
| 9,371,133 B2 | 6/2016 | Mays | |
| 9,513,635 B1 | 12/2016 | Bethke et al. | |
| 9,731,818 B2 | 8/2017 | Dekel et al. | |
| 9,840,339 B1 | 12/2017 | O'Brien et al. | |
| 10,186,348 B2 | 1/2019 | Davis et al. | |
| 2010/0268409 A1 | 10/2010 | Vian et al. | |
| 2012/0136630 A1 | 5/2012 | Murphy et al. | |
| 2012/0262708 A1 | 10/2012 | Connolly | |
| 2018/0043386 A1* | 2/2018 | Busby | B05B 9/007 |
| 2018/0072415 A1* | 3/2018 | Cantrell | B64D 1/22 |
| 2018/0120196 A1 | 5/2018 | Georgeson et al. | |
| 2018/0149947 A1* | 5/2018 | Kim | G05D 1/0038 |
| 2018/0244365 A1* | 8/2018 | Fisher | B64C 39/024 |
| 2018/0361571 A1 | 12/2018 | Georgeson et al. | |
| 2019/0084670 A1* | 3/2019 | Sharma | B64C 39/024 |
| 2019/0338759 A1* | 11/2019 | Badger | B29C 73/04 |
| 2020/0002000 A1 | 1/2020 | Dahlstrom | |
| 2020/0094958 A1* | 3/2020 | De Leon | B29C 73/02 |
| 2021/0078028 A1* | 3/2021 | Woll | B64D 37/16 |
| 2022/0064500 A1* | 3/2022 | Morioka | B32B 21/045 |

FOREIGN PATENT DOCUMENTS

| | | |
|---|---|---|
| EP | 3492379 A1 | 6/2019 |
| FR | 3036381 A1 | 11/2016 |
| KR | 20200008192 A | 1/2020 |

OTHER PUBLICATIONS

Extended European Search Report dated Apr. 30, 2021, in European Patent Application No. 20209188.0.
Nikolic et al., "A UAV System for Inspection of Industrial Facilities," Aerospace Conference, 2013 IEEE, Mar. 2-9, 2013.

* cited by examiner

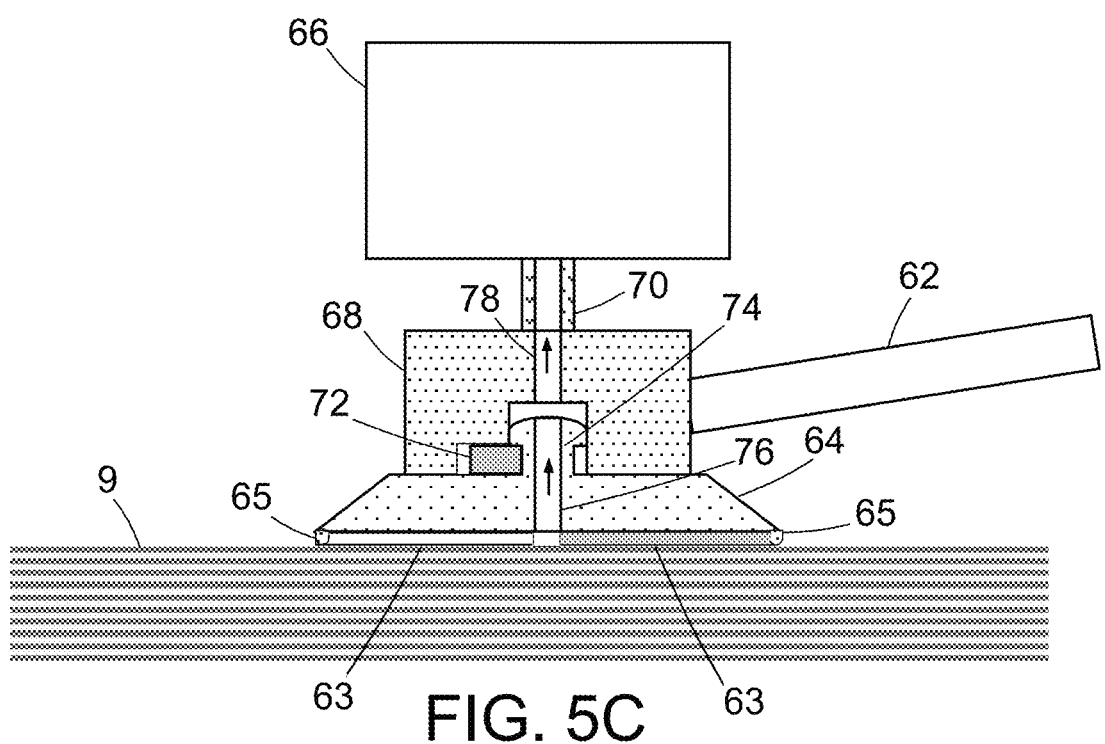

HOT BOND REPAIR OF STRUCTURES USING UNMANNED AERIAL VEHICLES

BACKGROUND

This disclosure generally relates to repair of structures. In particular, this disclosure relates to the use of unmanned aerial vehicles (UAVs) for in-service repair of inaccessible or limited-access structures.

In-service human-based repair of large structures and various types of large objects can be time consuming, expensive and difficult for an individual to perform. Examples of large structures that pose significant repair challenges include wind turbine blades, aircraft fuselages and wings, storage tanks, bridges, dams, levees, power plants, power lines or electrical power grids, water treatment facilities; oil refineries, chemical processing plants, high-rise buildings, and infrastructure associated with electric trains and monorail support structures.

More specifically, materials and structures employed in the aerospace industry and elsewhere may periodically require repair for in-service damage. Rapid inspection and repair of aircraft are important for military and commercial applications in order to decrease down time. For example, the use of composite structures is increasingly common on commercial aircraft. Composites may be damaged in the course of service. Examples of such in-service damage include impact damage due to hail, runway debris (object damage), or collisions with ground support vehicles.

In instances in which the inspection of a structure determines that the structure should undergo repair, such as to address a structural anomaly identified during the inspection, the repair should be performed in a timely manner so that the structure may be returned to service promptly. For example, damage may be discovered at the airport loading gate just prior to a departure. A repair may be provided that would be temporary or permanent depending on the extent of the damage. These may be non-structural (such as sealing the surface so moisture does not get in) or structural (restoring some level of strength to the area). The current approach for repair of impacts, delaminations, scratches, cracks, burns, or tears on most in-service aircraft (composite or metal) is to use manual labor, with lifts or stands, safety harnesses, etc. For minor or temporary repairs, this causes unnecessary operational delays, exposure to potential safety conditions and costs to return the aircraft to flight. The cost of access, labor, and related time to conduct the repair and loss of revenue during the interruption may be excessive. If repair equipment is not available or if the repair may be extensive, the flight might be cancelled. The aircraft may be grounded and taken out of service to be ferried or towed to a maintenance base, with consequent significant economic impact to the aircraft operator.

There is a need for automated apparatus for rapid repair and return to service of large composite structures (e.g., aircraft and wind turbine blades) after a planned structural maintenance check or after an event that may have created damage (e.g., lightning strike, physical impact, bird strike).

SUMMARY

The subject matter disclosed in some detail below is directed to methods and apparatus for performing repair operations using unmanned aerial vehicles (UAVs). The methods are enabled by equipping a UAV with tools for repairing a damaged composite laminate of a repairable structure (e.g., an aircraft or a wind turbine blade) that is not easily accessible to maintenance personnel. (A "repairable structure" is also referred to herein as a "target object". Hereinafter, the terms "repairable structure" and "target object" will be treated as interchangeable synonyms.) The apparatus includes a plurality of UAVs equipped with respective repair modules capable of performing automated repair operations of the method. The modules include tools which are designed to perform respective repair operations in sequence in accordance with a hot bond repair plan, which plan may take into account the results of a previously performed UAV-enabled inspection.

In accordance with one embodiment, a patch is carried to the repair site and applied to the repair area by an apparatus that includes a UAV, a payload support frame that is pivotably coupled to the UAV, and a patch applicator supported by the payload support frame. The UAV-carried patch applicator is configured to hot bond a patch to a repair area under remote control.

As used herein, the term "patch" means a composite laminate comprising a stack of plies, each ply consisting of fiber-reinforced plastic material. As used herein, the term "patch ensemble" refers to a combination of a patch applicator and a patch. In accordance with the teachings herein, a patch ensemble may be a payload supported by a payload support frame. Two types of patches are referred to herein: a repair patch and a surrogate patch. In the case wherein the composite patch is a surrogate patch, the patch ensemble will be referred to herein as a "surrogate patch ensemble"; in the case wherein the composite patch is a repair patch, the patch ensemble will be referred to herein as a "repair patch ensemble".

In addition, as used herein, the term "hot bond repair module" refers to a combination of a payload support frame and a patch applicator. More specifically, the term "hot bond repair module" includes the patch applicator and payload support frame and does not require the presence of a patch. As a result of these interpretations, an assembly does not require that a patch be vacuum adhered to the patch applicator in order to qualify as being a "hot bond repair module".

As used herein, the term "vacuum adherence" refers to one part adhered to another part due to the presence of a vacuum pressure in a sealed space bounded by respective surfaces of the parts. As used herein, the term "vacuum pressure" means a pressure less than the pressure of the ambient atmosphere. The vacuum pressure is due to partial evacuation (removal) of air from the sealed space.

In accordance with some embodiments, the UAV carries a repair patch ensemble containing all repair materials (including a repair patch, a heating blanket, and other ensemble materials) in a prepackaged form to the repair area. During flight of the UAV, the repair patch is vacuum adhered to the heating blanket. Vacuum pressure is also used to hold the repair patch ensemble in position on the composite surface of the structure. Then the hot bond process is enacted to bond the repair patch to the repair area. In accordance with one embodiment, the hot bond process involves heating to adhesively bond the repair patch to the repair area while applying vacuum pressure. Then the repair patch is released from the remainder of the ensemble and residual ensemble materials (e.g., heating blanket, bleeder material, release films, and vacuum pump) are removed and returned to the maintenance depot by the UAV.

Although various embodiments of methods and apparatus for performing a hot bond repair of a target object using a tool-equipped UAV are described in some detail later herein, one or more of those embodiments may be characterized by one or more of the following aspects.

One aspect of the subject matter disclosed in detail below is an apparatus comprising: an unmanned aerial vehicle comprising a body frame, a plurality of rotor motors mounted to the body frame, and a plurality of rotors operatively coupled to respective rotor motors of the plurality of rotor motors; a payload support frame pivotably coupled to the body frame of the unmanned aerial vehicle; and a patch applicator comprising a heating blanket support frame coupled to the payload support frame and a heating blanket having a perimeter attached to the heating blanket support frame. In accordance with one embodiment, the patch applicator further comprises: a bleeder material having a perimeter attached to the heating blanket support frame and disposed in adjacent and parallel relationship to the heating blanket; a release film having a perimeter attached to the heating blanket support frame and disposed between the heating blanket and the bleeder material; and a perforated release film having a perimeter attached to the heating blanket support frame and disposed in adjacent and parallel relationship to the bleeder material. As used herein, the term "perimeter" means a strip of material that forms a margin along a boundary line, not the boundary line alone. In accordance with one embodiment, "breather material" is a woven swatch that allows air to flow, yet captures excess bleed resin, while "release film" is a Teflon-coated plastic (e.g., polyethylene) film that traps excess bleed resin. Some release film is perforated, allowing air to pass while capturing the bulk of bleed resin.

Another aspect of the subject matter disclosed in detail below is a method for repairing a structure using a UAV, the method comprising: (a) coupling a patch applicator to a payload support frame; (b) pivotably coupling the payload support frame to a body frame of a UAV; (c) vacuum adhering a repair patch to the patch applicator with adhesive film on the repair patch facing away from the patch applicator; (d) flying the first UAV to a location where the adhesive film on the repair patch contacts a repair area on a surface of the structure; and (e) applying heat sufficient to convert the adhesive film into an adhesive bond sufficiently strong to hold the repair patch in place on the repair area. In accordance with one embodiment, the method further comprises: (f) vacuum adhering a flexible flange of the patch applicator to the surface in a region surrounding the repair area, wherein step (f) is performed subsequent to step (d) and prior to step (e).

A further aspect of the subject matter disclosed in detail below is an apparatus comprising a UAV and an indexing post placement module coupled to the UAV. The UAV comprises: a body frame; a plurality of rotor motors mounted to the body frame; and a plurality of rotors operatively coupled to respective rotor motors of the plurality of rotor motors. The indexing post placement module comprises: a spacer bar attached to the body frame of the UAV; an indexing post holder attached to or integrally formed with one end of the spacer bar and comprising a latch and a channel; and a vacuum pump mounted to the spacer bar and in flow communication with the channel of the indexing post holder.

Yet another aspect of the subject matter disclosed in detail below is a method for repairing a surface area of a structure using UAVs, the method comprising: (a) releasably coupling first and second indexing posts to an indexing post placement module; (b) coupling the indexing post placement module to a first UAV; (c) flying the first UAV to a location where the first and second indexing posts contact the surface of the structure at respective positions outside of an area to be repaired; (d) adhering the first and second indexing posts to the surface of the structure at the respective positions; (e) decoupling the first and second indexing posts from the indexing post placement module; (f) flying the first UAV with the indexing post placement module away from the surface of the structure; (g) placing a cover sheet on the surface of the structure by fitting one end of a cover sheet rod on the first indexing post and fitting another end of the cover sheet rod on the second indexing post using a second UAV; (h) coupling a surface preparation module to a third UAV; (i) flying the third UAV to a location where the surface preparation module is adjacent to the area to be repaired; (j) preparing the surface of the structure in the area to be repaired using the surface preparation module; (k) flying the third UAV with the surface preparation module away from the surface of the structure; (l) coupling a hot bond repair module to a fourth UAV; (m) releasably adhering a repair patch to the hot bond repair module; (n) flying the fourth UAV to a location where the repair patch covers the area to be repaired; (o) bonding the repair patch to the area to be repaired; (p) releasing the repair patch from the hot bond repair module; and (q) flying the fourth UAV with hot bond repair module away from the surface of the structure.

Other aspects of methods and apparatus for performing a hot bond repair of a target object using a tool-equipped UAV are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIGS. 5A-5F are diagrams representing partly sectional side views of an indexing post at six stages during a process for adhering the indexing post to a surface of a target object in accordance with the embodiment depicted in FIGS. 4A-4C.

Reference will hereinafter be made to the drawings in which similar elements in different drawings bear the same reference numerals.

DETAILED DESCRIPTION

Figure 1A:
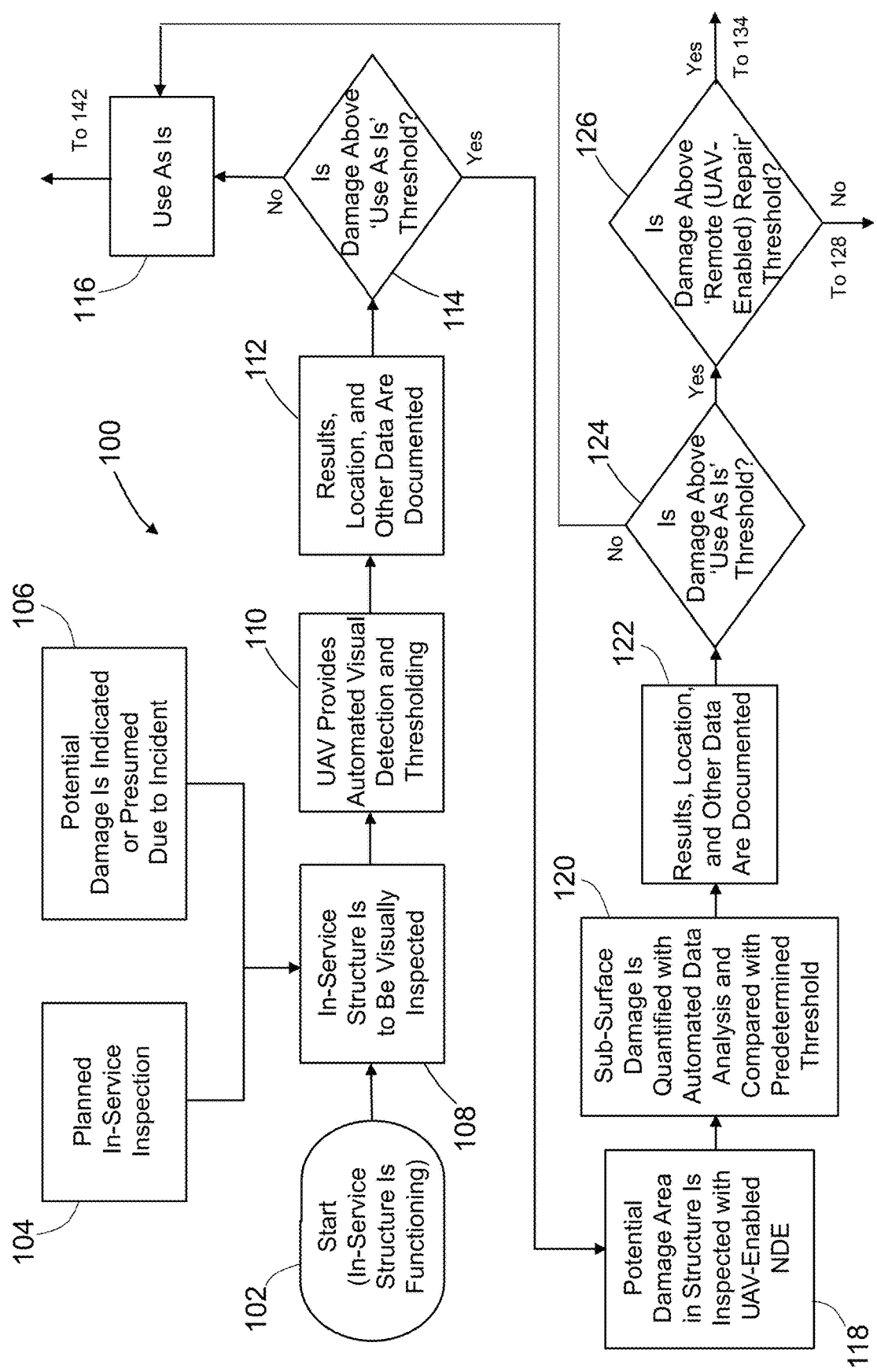
FIGS. 1A and 1B form a flowchart identifying steps of a method for inspecting and repairing a damaged portion of a large repairable structure or target object using one or more UAVs in accordance with some embodiments.

For the purpose of illustration, methods and apparatus for performing a hot bond repair of a target object using a tool-equipped UAV will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The terms "repairable structure" and "target object" as used herein is not limited to aircraft and wind turbines. This disclosure relates to systems and methods that can be used to inspect and repair any number of parts or structures of different shapes and sizes. In addition, an inspected and repaired structure can include various components, such as a substructure for providing additional support to the structure.

In accordance with the embodiments disclosed in some detail below, the UAV takes the form of a rotorcraft having at least three rotors. In accordance with the implementation disclosed herein, each rotor has two mutually diametrally opposed rotor blades. However, in alternative proposed implementations, UAVs having rotors with more than two rotor blades may be used. As used herein, the term "rotor" refers to a rotating device that includes a rotor mast, a rotor hub mounted to one end of the rotor mast, and two or more rotor blades extending radially outward from the rotor hub. In the embodiments disclosed herein, the rotor mast is mechanically coupled to an output shaft of a drive motor, referred to hereinafter as a "rotor motor". The rotor motor drives rotation of the rotor. As used herein, the term "rotor system" means a combination of components, including at least a plurality of rotors and a controller configured to control rotor rotation rate to generate sufficient aerodynamic lift force to support the weight of the UAV and sufficient thrust to counteract aerodynamic drag in forward flight. The UAVs disclosed herein include a controller which preferably takes the form of a plurality of rotor motor controllers that communicate with an on-board computer configured to coordinate the respective rotations of the rotors. The controller is configured (e.g., programmed) to control the rotors to cause the UAV to fly along a flight path to a location where the UAV is in proximity or contact with an area on the surface of a structure to be inspected and repaired. (As used herein, the term "location" comprises position in a three-dimensional coordinate system and orientation relative to that coordinate system.)

In accordance with various embodiments of the process proposed herein, a UAV is configured to perform a repair operation in a manner that enables a large structure, such as an aircraft or a wind turbine, to be returned to service quickly after an impact incident or discovery of potential damage. In accordance with some embodiments, the UAV is equipped with means for collecting information (e.g. image, scans, and three-dimensional (3-D) location data) which may indicate the presence of anomalies.

Figure 1B:
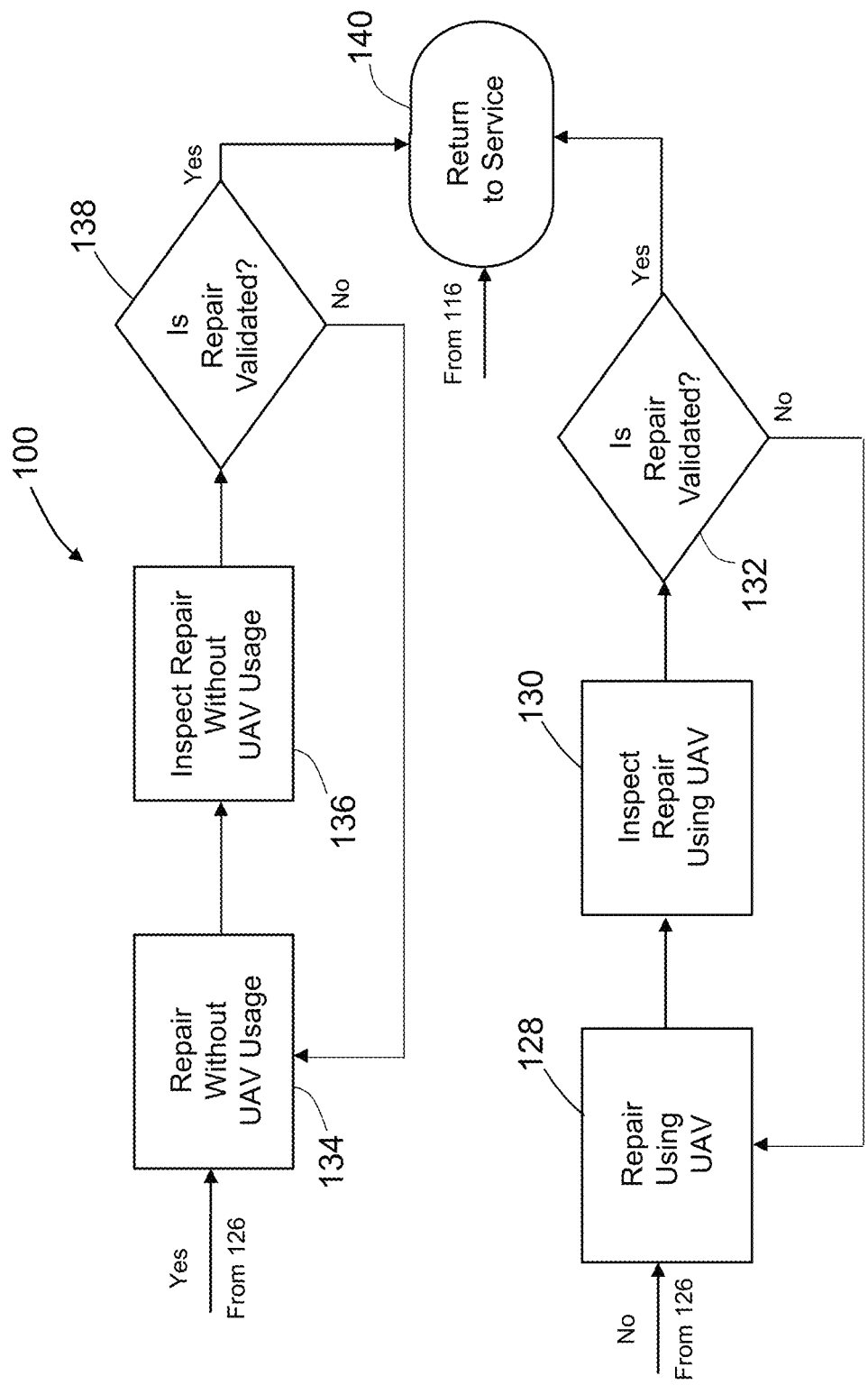

FIGS. 1A and 1B form a flowchart identifying steps of a method 100 for inspecting and repairing a damaged portion of a large structure or object that is in service using one or more UAVs. As will be explained in more detail below, a computer on-board the UAV may be configured to determine whether acquired data indicates damage greater (above) or less (below) than a particular threshold value. As used herein, a "use as is" threshold means a threshold which has been specified to demarcate between structure that does not require a repair (e.g., if the indicated damage is less than or below the "use as is" threshold) and structure that potentially requires repair (e.g., if the indicated damage is greater than or above the "use as is" threshold). As used herein, a "remote repair" threshold means a threshold which has been specified to demarcate between structure that requires a repair that could be performed by a UAV (e.g., if the indicated damage is less than or below the "remote repair" threshold) and structure that requires a repair not performed by a UAV (e.g., if the indicated damage is greater than or above the "remote repair" threshold).

Referring to FIG. 1A, at the start 102 of the method 100, the in-service structure is functioning, but either the scheduled time for a planned in-service inspection has arrived (step 104) or potential damage to the in-service structure is indicated or presumed due to an incident (step 106). For example, an object impact event has been detected or suspected.

The overall inspection and repair process is initiated when a maintenance operations center dispatches a UAV equipped with a camera to perform a visual inspection of the in-service structure (step 108). The dispatched UAV flies to the vicinity of the possible impact area (hereinafter "area of interest"), uses the camera to acquire images of the area of interest, and then compares the acquired image data to a first "use as is" threshold (step 110). The results of the visual inspection and thresholding, the location of the imaged area and other data are then recorded in a non-transitory tangible computer-readable storage medium on-board the camera-equipped UAV (step 112). A computer on-board the camera-equipped UAV then makes a determination whether the damage indicated by the image data is above the first "use as is" threshold or not (step 114). In the alternative, if the camera-equipped UAV is not also equipped with an NDI sensor unit, then the camera-equipped UAV wirelessly transmits data representing the results of the visual inspection and thresholding, data representing the location of the imaged area and other data to the maintenance operations center for evaluation.

On the one hand, if a determination is made in step 114 that the damage indicated by the image data is not above the first "use as is" threshold, then the structure is used as is (step 116) and returned to service (step 140 in FIG. 1B). On the other hand, if a determination is made in step 114 that the damage indicated by the image data is above the first "use as is" threshold, then a UAV equipped with an NDI sensor unit (which may be the same UAV as the camera-equipped UAV or a separate UAV) is flown to a location where the NDI sensor unit is within an measurement range of the potentially damaged area (hereinafter "potential damaged area") on the surface of the structure. For example, the NDI sensor-equipped UAV may land on the surface of the structure and then use the NDI sensor unit to acquire NDI sensor data in the potential damaged area (step 118). The computer on-board the NDI sensor-equipped UAV then performs an analysis of the NDI sensor data that quantifies the sub-surface damage and compares the resulting quantitative data to various predetermined thresholds (step 120). The results of the analysis and thresholding, the location of the sensed area and other data are then recorded in a non-transitory tangible computer-readable storage medium on-board the NDI sensor-equipped UAV (step 122). A computer on-board the NDI sensor-equipped UAV then makes a determination whether the damage indicated by the NDI sensor data is above a second "use as is" threshold or not (step 124). In the alternative, if the NDI sensor-equipped UAV is not also equipped with a repair tool, then the NDI sensor-equipped UAV wirelessly transmits data representing the results of the analysis and thresholding, data representing the location of the sensed area and other data to the maintenance operations center for evaluation.

On the one hand, if a determination is made in step 124 that the damage indicated by the NDI sensor data is not above the second "use as is" threshold, then the structure is used as is (step 116) and returned to service (step 142 in FIG. 1B). On the other hand, if a determination is made in step 124 that the damage indicated by the NDI sensor data is above the second "use as is" threshold, then the computer on-board the NDI sensor-equipped UAV then makes a determination whether the damage indicated by the NDI sensor data is below a "remote repair" threshold or not (step 122). In the alternative, if the NDI sensor-equipped UAV is not also equipped with a repair tool, then the maintenance operations center has a computer programmed to make the determination in step 124.

Depending on the outcome of step 122 (shown in FIG. 1A), the process may proceed in accordance with either a remote or UAV-enabled repair procedure or a manual repair procedure that requires human intervention, the steps of both of which are identified in FIG. 1B. On the one hand, if a determination is made in step 122 that the damage indicated by the NDI sensor data is not above the "remote repair" threshold, then a UAV equipped with a repair tool (which may be the same UAV as the camera-equipped UAV or a separate UAV) is flown to a location where the repair tool is placed in contact with the structure in the area to be repaired. While the repair tool-equipped UAV is stationary, the damaged area is repaired using the repair tool (step 128 in FIG. 1B). On the other hand, if a determination is made in step 122 that the damage indicated by the NDI sensor data is above the "remote repair" threshold, then the NDI sensor-equipped UAV wirelessly transmits a message notifying the maintenance operations center that the structure requires direct human access for a more in-depth or complicated repair of the damaged structure (step 134 in FIG. 1B). In the latter case, a UAV-enabled repair is not made.

Still referring to FIG. 1B, following completion of the UAV-enabled repair in step 128, a UAV equipped with either a camera or an NDI sensor unit (which may be the same UAV as the camera-equipped or NDI sensor-equipped UAV described above or a separate UAV) is used to perform an inspection to verify that the repaired structure is good for service (step 130). The results of the inspection are stored in a non-transitory tangible computer-readable storage medium on-board the inspecting UAV and the UAV wirelessly transmits a message to the maintenance operations center reporting completion of the repair. A determination is then made whether the repair is validated or not (step 132). On the one hand, if the repair is not validated, then the repair procedure returns to step 128. On the other hand, if the repair is validated, then the repaired structure is returned to service (step 140).

Conversely, following issuance of the notification indicating that a repair by means not including a UAV (e.g., a manual repair) is recommended, the maintenance operations center dispatches appropriately equipped technicians to conduct a repair of the damaged area on the structure (step 134). Following completion of the repair by means not including a UAV in step 134, a NDI or visual inspection of the repaired portion of the structure is performed, also by means not including a UAV (step 136). A determination is then made whether the repair is validated or not (step 138). On the one hand, if the repair is not validated, then the repair procedure returns to step 134. On the other hand, if the repair is validated, then the repaired structure is returned to service (step 140).

Various embodiments of apparatus for performing a repair of the damaged area on the surface of a structure (step 128) will now be described in some detail. The tools and tool support devices carried by a UAV will be referred to herein as the "payload". Such a repair payload may be fixedly or pivotably coupled to the body frame of the UAV or may be fixedly coupled to a payload support frame which is pivotably coupled to the UAV body frame. Some of the repair payloads disclosed herein are referred to herein as modules. As used herein, the term "module" refers to an independently operable unit that may be attached to a UAV and comprises an assembly of electronic and mechanical components configured perform repair functions using that repair matter.

The UAVs disclosed herein include a controller which preferably takes the form of a plurality of rotor motor controllers that communicate with an onboard computer system configured to coordinate the respective rotations of the rotors. The controller is configured (e.g., programmed) to control the rotors in accordance with flight guidance received from a 3-D localization system that tracks the location of the UAV relative to the target environment. The target destination of the UAV is a location where a plurality of standoff contact elements of the UAV contact the surface of the structure to be repaired (hereinafter "repairable structure"). Once the standoff contact elements are in contact with the surface of the repairable structure, the controller activates surface attachment devices (e.g., vacuum adherence devices) to maintain the UAV stationary at the location with the standoff contact elements abutting the surface. Then the repair tools are sequentially positioned and activated to perform respective repair operations. Upon completion of the repair procedure, the UAV releases the surface attachment devices and lifts offs from the surface, again using reorientation and speed changes on a subset of the rotors.

Figure 2:
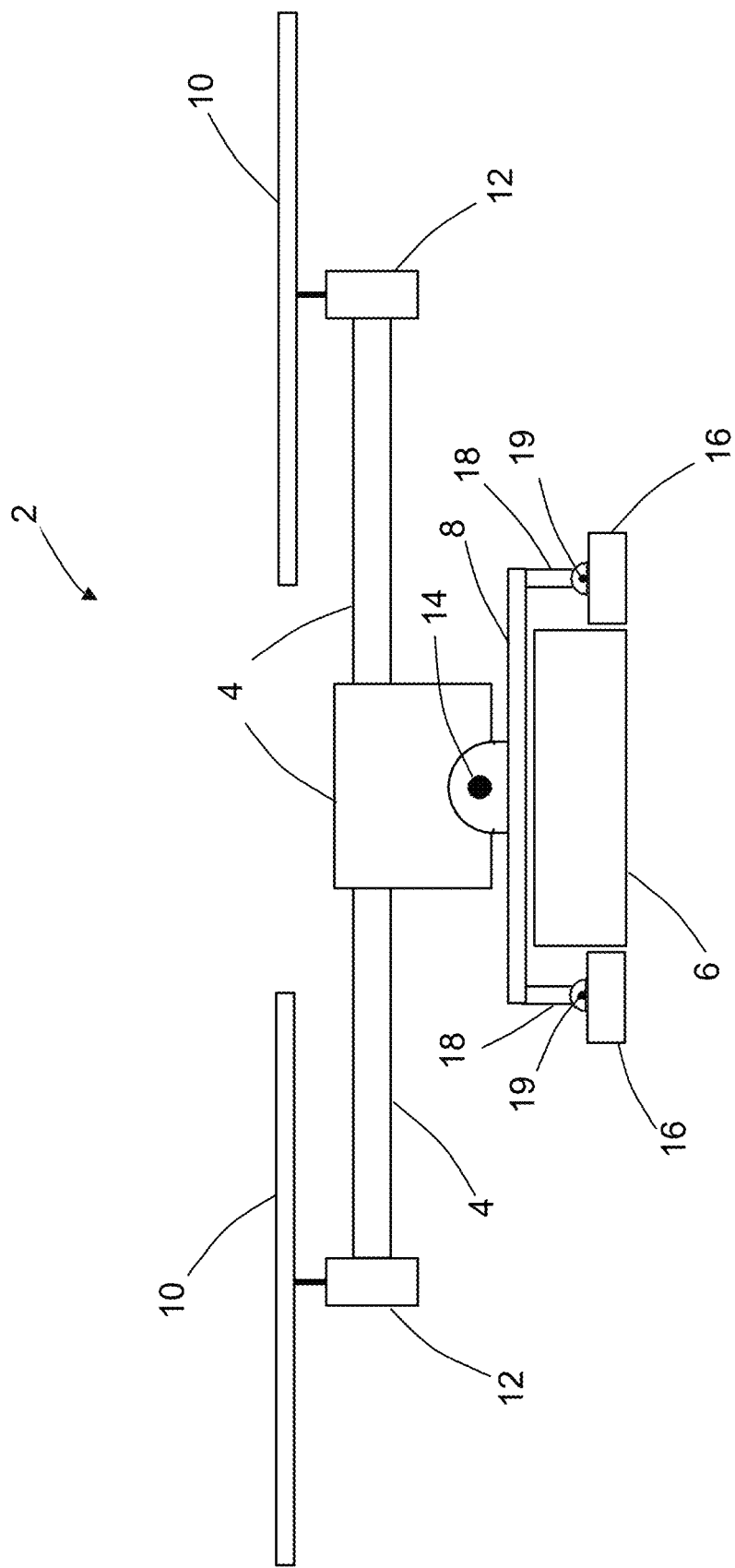
FIG. 2 is a diagram representing a side view of a payload-carrying UAV in accordance with one embodiment.

The UAV 2 depicted in FIG. 2 carries a payload 6 which includes one or more tools for performing a repair function on a surface of a remote limited-access structure. As seen in FIG. 2, the UAV 2 includes a UAV body frame 4, a plurality (at least three) of rotor motors 12 mounted to the UAV body frame 4, and a plurality of rotors 10 respectively operatively coupled to the plurality of rotor motors 12. In addition, the UAV 4 includes a payload support frame 8 pivotably coupled to the UAV body frame 4 by means of a gimbal pivot 14. The payload support frame 8 includes a plurality of (at least three) standoff support members 16. A respective standoff contact foot 18 is coupled to the distal end of each standoff support member 16. In one proposed implementation, the standoff contact feet 18 are made of compliant (e.g., elastomeric) material. The standoff support members 16 and standoff contact feet 18 form a standoff system that maintains the payload 6 in a standoff position relative to the surface being repaired.

Figure 2A:
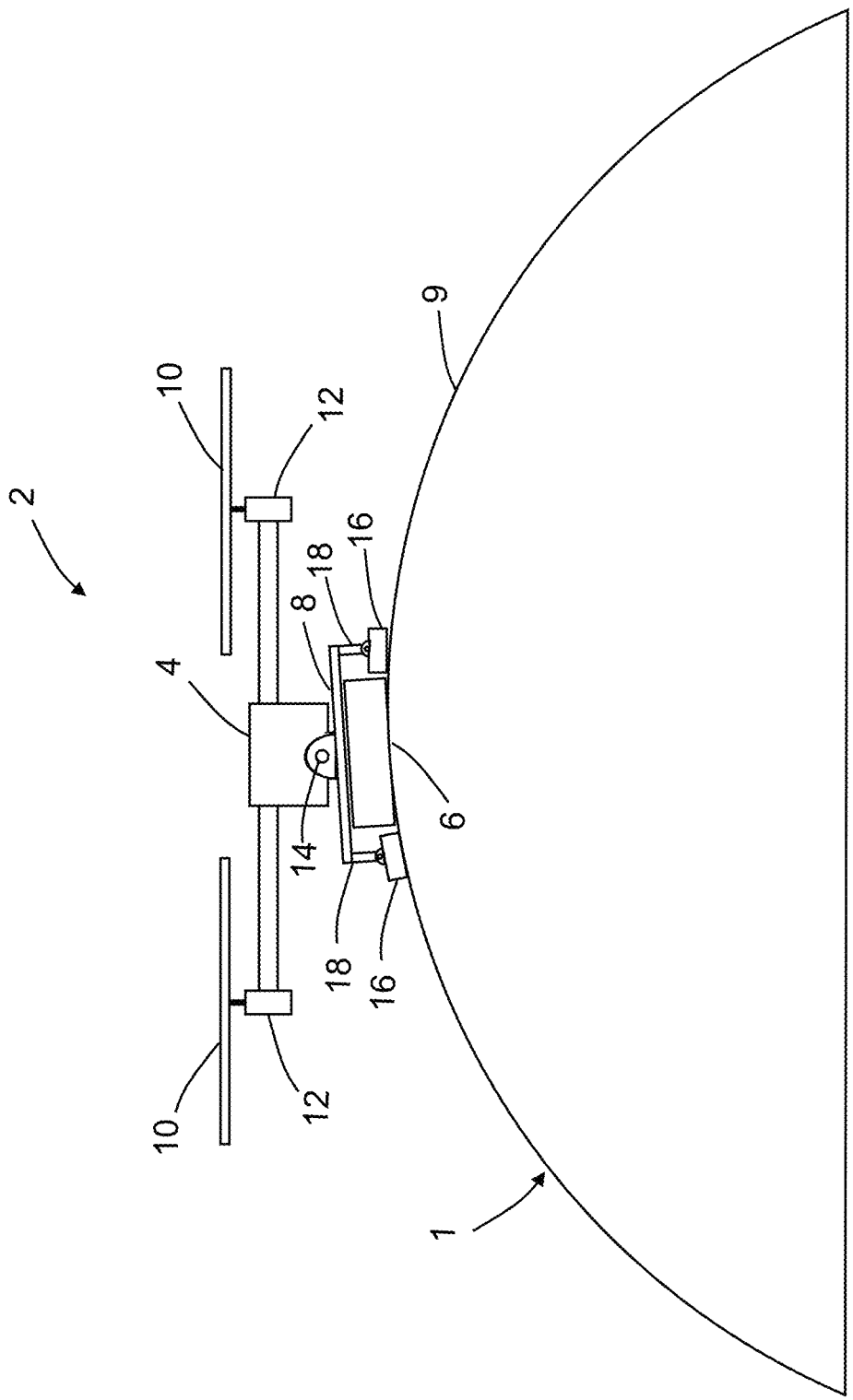
FIG. 2A is a diagram representing a side view of the payload-carrying UAV depicted in FIG. 2 after landing on a structure having a rounded surface, such as an aircraft fuselage or a storage tank.
Figure 2B:
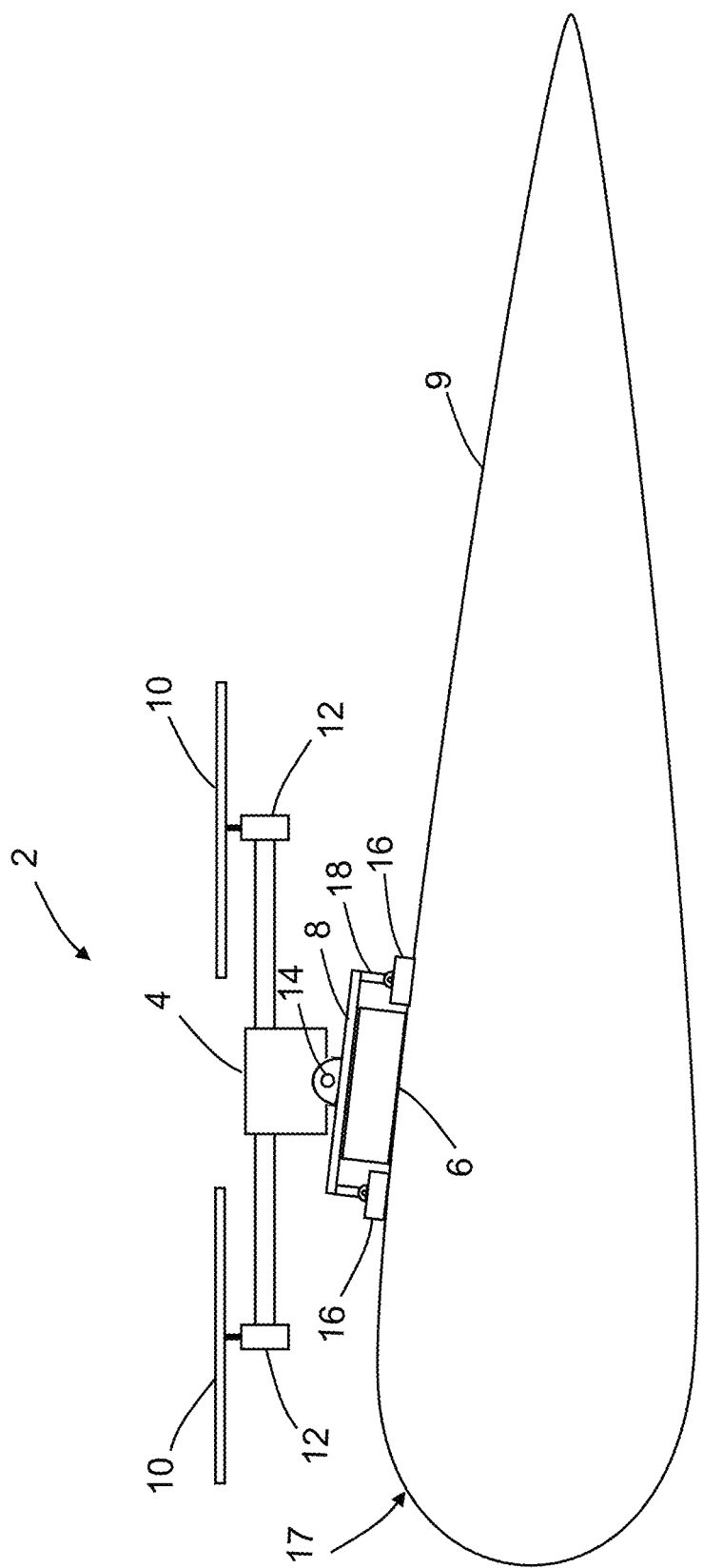
FIG. 2B is a diagram representing a side view of the payload-carrying UAV depicted in FIG. 2 after landing on an airfoil-shaped body, such as an aircraft wing or a wind turbine blade.

In accordance with the embodiment depicted in FIG. 2, the standoff contact feet 18 are pivotably coupled to the distal ends of the standoff support members 16 by means of respective pivots 19. The pivotable coupling enables the standoff contact feet 18 to adjust their orientations so that the feet lie flat on curved surfaces. FIG. 2A shows the payload-carrying UAV 2 after landing on a target object 1 having a surface 9, such as the surface an aircraft fuselage or the upper surface of a storage tank. FIG. 2B shows the same UAV 2 after landing on a surface 9 of an airfoil-shaped body 17 such as an aircraft wing or a wind turbine blade. In both scenarios, each standoff contact foot 18 is able to reorient to be parallel to a flat or tangent to a surface 9 in the area of abutment.

In accordance with the embodiments disclosed below, a UAV 2 is configured to carry a payload that includes an apparatus for reworking a damaged area on a surface of a composite structure by installing a repair patch. Rework is occasionally required on composite structures in order to remove an anomaly. An anomaly may comprise a crack, a delamination, a void, a dent, porosity or other inconsistencies in the composite structure. An anomaly may require rework when a characteristic of the anomaly falls outside of desired tolerances. The removal of the anomaly may require the reworking of an area in the composite structure containing the anomaly by removing a portion of the composite structure containing the anomaly and replacing the removed material with a patch. The patch (hereinafter "repair patch") is typically formed as a stack of plies of composite material of the same or different type from which the composite structure is formed. The stacking sequence and fiber orientation of the composite plies in the repair patch may correspond to the stacking sequence and fiber orientation of the plies that make up the composite structure. As used herein, the term "composite material" means fiber-reinforced plastic material (such as an epoxy resin matrix reinforced with embedded carbon fibers).

After assembling the repair patch from the stack of plies, the repair patch is typically bonded to the rework area with adhesive installed at the bondline between the repair patch and the rework area. Heat and pressure are typically applied to the repair patch such as with a heating blanket and a vacuum bag. The heating blanket (e.g., comprising electrically resistive heating elements embedded in a thermally conductive matrix) may be used to elevate the bondline to the appropriate adhesive curing temperature. During curing, the bondline may be held within a relatively narrow temperature range for a predetermined period of time in order to fully cure the adhesive. Furthermore, the entire area of the bondline may be held within the temperature range without substantial variation across the bondline.

Prior to bonding the repair patch to the rework area, a thermal survey may be required for the rework area. The thermal survey may be required to identify locations of non-uniform heating of the rework area by the heating blanket. Non-uniform heating may be caused by adjacent structure that may act as a heat sink drawing heat away from localized portions of the rework area, resulting in differential heating of the bondline. In this regard, the thermal survey may provide information concerning the locations of hot and cold spots in the rework area (hereinafter referred to as "thermal profiling") such that adjustments can be made by adding temporary insulation to the composite structure and/or by adjusting the heating from the heating blanket until the temperature is within the required range.

The thermal survey process may involve assembling a surrogate patch that is a duplicate of the repair patch that is to be permanently bonded to the composite structure. In this regard, the conventional surrogate patch is formed of the same type of composite material and with the same number of plies as the repair patch. Construction of a surrogate patch is a time-consuming and labor-intensive process typically requiring hand-cutting of multiple composite plies each having a unique size and shape for each one of the rework area plies to be replaced. After the thermal survey, the surrogate patch is typically discarded following a single use.

In addition to the thermal survey, a moisture removal process may be required to remove unwanted moisture from the rework area in order to improve the final bond between the repair patch and the rework area by reducing the risk of porosity within the bondline. A conventional moisture removal process comprises a drying cycle and may be required on composite structure that has been in service for a certain period of time and/or when certain adhesives are used in the repair process.

The UAVs disclosed herein include a flight control system which preferably takes the form of a plurality of rotor motor controllers that communicate with an onboard computer system (e.g., a flight controller) configured to coordinate the respective rotations of the rotors. In particular, a UAV may be designed to carry a payload that includes a patch applicator capable of remotely hot bonding a repair patch to a repair area on a surface of a difficult-to-access structure. For a UAV configured to apply a repair patch on the surface of a structure by hot bonding, the flight controller is programmed to fly the UAV along a path to a location where the repair patch is seated in a scarfed area on the surface of the repairable structure. Once the repair patch is mated with the scarfed area, a repair process controller causes the repair patch to be hot bonded to the scarfed area by application of vacuum pressure and heat. Upon completion of the repair procedure, the repair patch is released from the patch applicator and then the UAV is operated to disengage carry patch applicator back to the maintenance facility on the ground.

Various embodiments of apparatus for performing a hot bond repair of a repair area on a surface of a composite structure (step 128 in FIG. 1B) will now be described in some detail. The steps of the remotely controlled hot bond repair process are performed by respective UAVs which are configured to carry different payloads. For example, the payload for performing the hot bonding operation includes a patch applicator and repair patch (collectively referred to herein as a "repair patch ensemble"). Such a repair payload may be coupled to a payload support frame, which in turn is pivotably coupled to the UAV body frame. Other repair payloads disclosed herein are referred to as "modules". As used herein, the term "module" refers to an independently operable unit that may be attached to a UAV and comprises an assembly of electronic and mechanical components configured to perform one or more repair functions.

Figure 3:
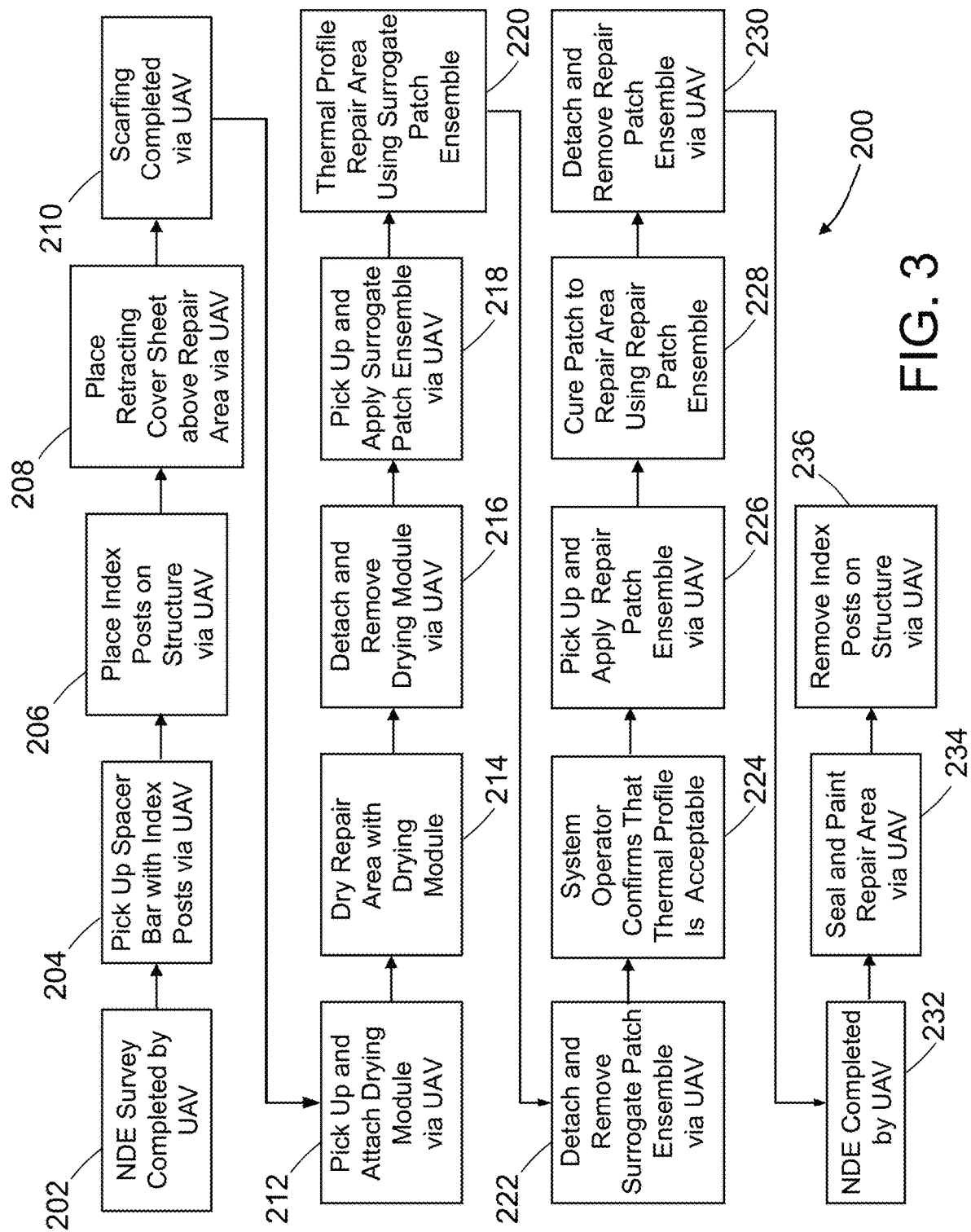
FIG. 3 is a flowchart identifying steps of a method for performing a hot bond repair of a damaged portion of a large repairable structure or target object using UAVs in accordance with one embodiment.

FIG. 3 is a flowchart identifying steps of a method 200 for performing a hot bond repair of a damaged area on a surface of a structure using UAVs in accordance with one embodiment. At the start of the process, a first UAV equipped with a non-destructive examination (NDE) sensor unit flies to the structure and performs an NDE survey of the surface (step 202). Any damage detected is characterized and located relative to structural features of the structure. If a decision is made to repair the anomaly, then a spacer bar with indexing posts is picked up by a second UAV (step 204). (As used in FIG. 3 and associated description, the phrase that the "UAV picks up" a module or ensemble means that the module or ensemble is coupled to the UAV on the ground and then the UAV takes off.) The second UAV then places the indexing posts on the surface of the structure (step 206). The spacer bar is placed at a specified location relative to the repair area (also referred to herein as "the damaged area"). Also, the spacer bar ensures proper spacing of the attached indexing posts. After the indexing posts have been adhered to the surface by the second UAV, a third UAV places a retractable cover sheet above the repair area using the indexing posts to ensure that the cover sheet is correctly located (step 208). Optionally, the cover sheet may be extended to cover the repair area pending the arrival of the next UAV.

The next UAV is equipped with a sander for performing a scarfing operation that prepares the repair area to receive a hot-bonded repair patch (step 210). The sander may be incorporated in a module that is coupled to the indexing posts to ensure that the scarfing is consistent with the specifications of the repair patch to be installed. After the sander has been removed, another UAV picks up a drying module at the maintenance depot, flies to the repair site, and attaches the drying module to the surface of the structure (step 212). The extended cover sheet is retracted prior to deployment of the drying module. Following deployment, the drying module is remotely controlled to dry the repair area (step 214). Optionally, the drying module also has an air nozzle for removing surface debris. The drying module is then detached from the surface and the UAV then carries the drying module back to the maintenance depot (step 216). Optionally, the cover sheet may be again extended following removal of the drying module.

At a subsequent time, a UAV picks up a human-fabricated surrogate patch ensemble and places the surrogate patch ensemble in contact with the repair area using the indexing posts to ensure correct positioning of the payload support frame (step 218). If extended, the cover sheet is retracted prior to ensemble deployment. Following ensemble deployment, the surrogate patch is subjected to vacuum pressure and heated and a thermal profile of the repair area is acquired (step 220). The surrogate patch includes thermocouples which may be wirelessly monitored by a system operator on the ground. Upon completion of thermal profiling, the surrogate patch ensemble is detached from the surface and the UAV carries the surrogate patch ensemble to the maintenance depot (step 222). In the meantime, the system operator confirms that the thermal profile is within acceptable limits (step 224). If the thermal profile is unacceptable, then the thermal insulation of the surrogate patch ensemble is adjusted and the thermal profiling procedure is repeated using the modified ensemble.

If the thermal profile is acceptable, then the same UAV may be used to pick up a human-fabricated repair patch ensemble and place the repair patch ensemble in contact with the repair area using the indexing posts to ensure correct positioning of the payload support frame (step 226). If extended, the cover sheet is retracted prior to ensemble deployment. Following ensemble deployment, the repair patch is subjected to vacuum pressure and heated in accordance with a curing protocol, thereby adhesively bonding the repair patch to the repair area (step 228). Upon completion of the hot bonding operation, the repair patch is released from the remainder of the repair patch ensemble and the UAV carries the remainder of the repair patch ensemble to the maintenance depot (step 230).

After the repair patch has been bonded to the repair area, the first UAV returns to the structure and performs an NDE survey of the repaired surface (step 232). Any anomalies detected are characterized and located relative to structural features of the structure. If the NDE survey indicates that the anomalies are excessive, then the system operator will determine what remedial action should be taken. If the repair is acceptable, a UAV is dispatched to seal and paint the repair area (step 234). Then the second UAV returns to the repair site and removes the indexing posts from the surface of the structure (step 236).

Some of the processes briefly described with reference to FIG. 3 will now be described in more detail. Following a determination that a UAV-enabled hot bonding repair should be performed, a plurality of indexing posts are attached to the surface of the repairable structure in the vicinity of the repair area using a specially designed UAV. The indexing posts are configured to aid in locating a patch applicator that will be carried to the repair site by a differently designed UAV at a subsequent stage in the UAV-enabled hot bond repair process.

Figure 4A:
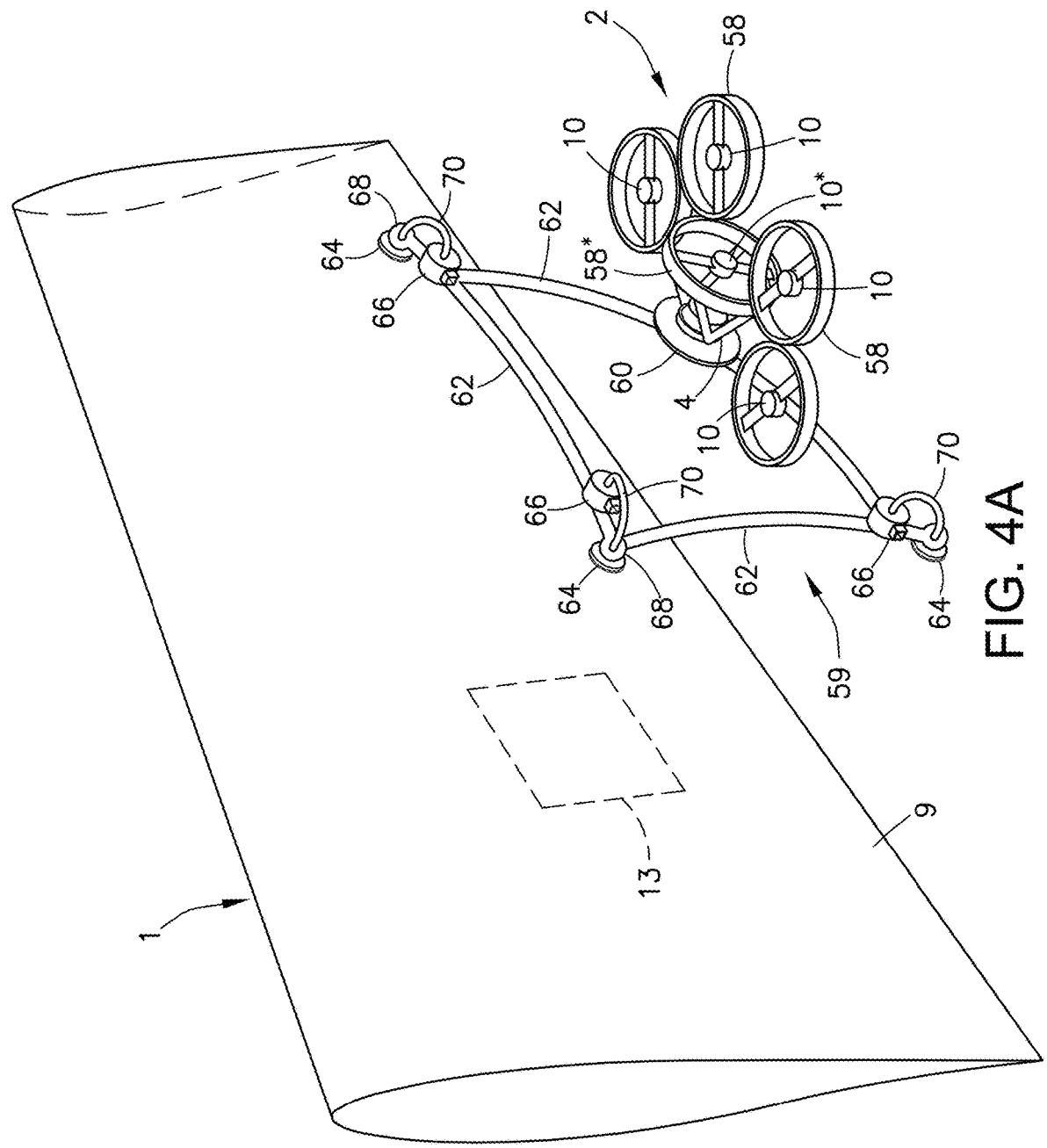
FIGS. 4A-4C are diagrams representing respective three-dimensional views of a payload-carrying UAV at three stages during execution of a process for attaching indexing posts on a surface of a target object in accordance with one embodiment. The payload includes a spacer bar configured to place a plurality of indexing posts on the surface of the target object.
Figure 4B:
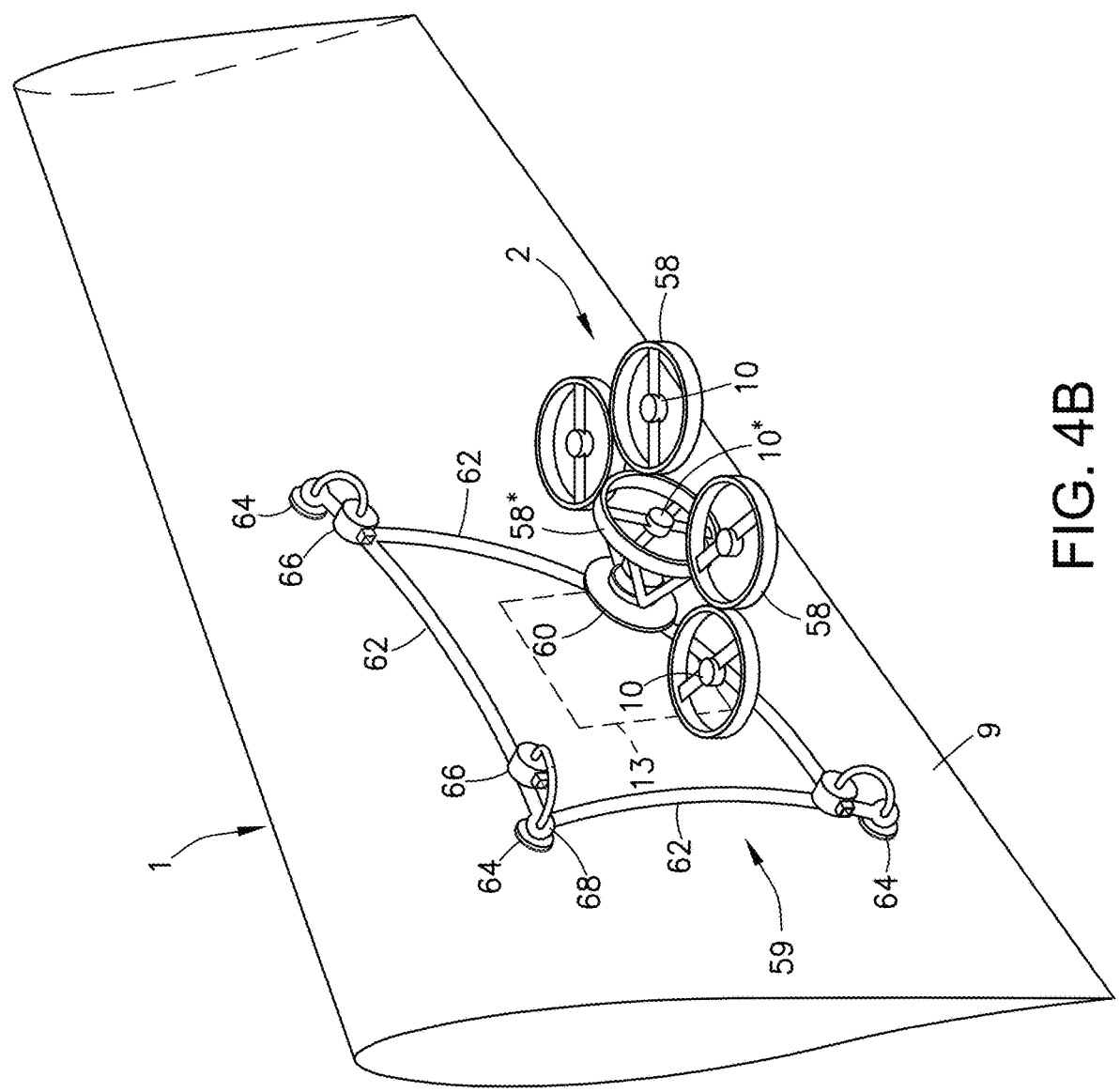
Figure 4C:
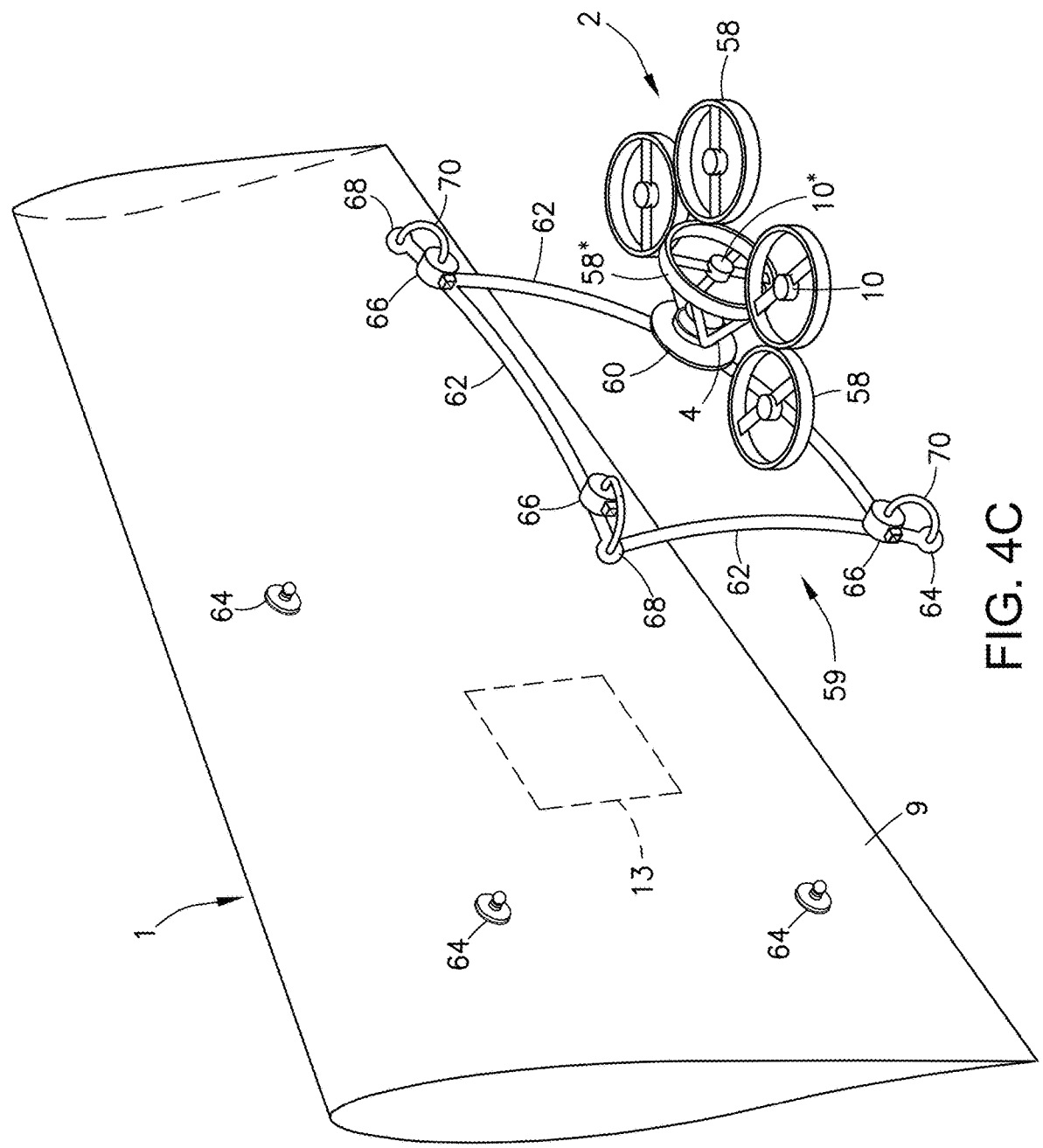

FIGS. 4A-4C are diagrams representing respective three-dimensional views of a payload-carrying UAV 2 at three stages during execution of a process for attaching a plurality of indexing posts 64 on a surface 9 of a target object 1 in accordance with one embodiment. In the first stage depicted in FIG. 4A, the UAV 2 is in flight and approaching a surface 9 of a target object 1 (e.g., an airfoil-shaped body). The UAV 2 is carrying a payload in the form of an indexing post placement module 59 to which the indexing posts 64 are releasably coupled. In the second stage depicted in FIG. 4B, the indexing posts 64 are in contact with the surface 9 while the UAV 2 produces a horizontal thrust that presses the indexing posts 64 against the surface 9. In the third stage depicted in FIG. 4C, the indexing posts 64 have been attached to the surface 9 and released by the indexing post placement module 59 and the UAV 2 is flying away from the surface 9 while carrying the indexing post placement module 59.

For the sake of simplicity and to avoid clutter in the drawings, FIGS. 4A-4C show only some components of a UAV, including only a portion of a body frame 4. In addition to the body frame 4, the UAV 2 depicted in FIGS. 4A-4C includes a rotor system consisting of rotors 10 and 10*, rotor motors (not shown), and a controller (not shown). In the depicted example, each rotor has two rotor blades. However, each rotor may have more than two rotor blades. The UAV 2 includes four vertical rotors 10 and four vertical rotor motors (not shown) which respectively drive rotation of vertical rotors 10. The UAV 2 further includes a normal rotor 10* and a normal rotor motor (not shown) which drives rotation of the normal rotor 10*. As used herein, the term "vertical rotor" means a rotor having an axis of rotation that is vertical when the UAV 2 is level (e.g., the pitch, yaw and roll angles each equal zero degrees). As used herein, the term "normal rotor" means a rotor having an axis of rotation that is normal to a vertical plane intersecting the axis of rotation of the vertical rotor defined in the immediately preceding sentence. In accordance with one proposed implementation, the plurality of rotors comprise first through fourth rotors 10 having axes of rotation which are parallel and a fifth rotor (e.g., normal rotor 10*) having an axis of rotation perpendicular to the axes of rotation of the first through fourth rotors 10.

The UAV 2 depicted in FIGS. 4A-4C further includes a body frame 4 designed to support the aforementioned rotors, motors, and controller. Body frame 4 may comprise integrally formed sections or fastened or joined parts. The body frame 4 includes four vertical rotor deflector rings 58 and a normal rotor deflector ring 58* having fixed positions relative to each other. The rotor masts of vertical rotors 10 are rotatable inside bearings (not shown in the drawings), which bearings are supported by radial struts (not shown) which connect to the vertical rotor deflector rings 10. The vertical rotor motors (not shown) are also mechanically coupled to the vertical rotor deflector rings 10 by radial struts (not shown). Likewise the rotor mast of normal rotor 10* is rotatable inside a bearing (not shown) supported by radial struts which connect to the normal rotor deflector ring 58*. The normal rotor motor (not shown) is also mechanically coupled to the normal rotor deflector ring 58* by radial struts (not shown).

In accordance with the embodiment depicted ion FIGS. 4A-4C, the payload carried by UAV 2 is an indexing post placement module 59 that includes a spacer bar support frame 60 and a plurality of spacer bars 62 (e.g., first, second and third spacer bars) configured to respectively place a plurality of indexing posts 64 (e.g., first, second and third spacer bars) on the surface 9 of the target object 1. In accordance with one proposed implementation, the UAV-enabled method for hot bond repair of a damaged area on the surface 9 comprises the following steps: (a) First and second indexing posts are releasably coupled to an indexing post placement module 59. (b) The indexing post placement module 59 is coupled to UAV 2. (c) UAV 2 is then flown to a location where the first and second indexing posts 64 contact the surface 9 of target object 1 at respective positions outside of a repair area 13 (as seen in FIG. 4B). (d) The first and second indexing posts 64 are then adhered to the surface 9 at respective positions. (e) Then the first and second indexing posts 64 are decoupled from the indexing post placement module 59. (f) The UAV 2 then flies away from the surface 9 and carries the indexing post placement module 59 back to the maintenance depot.

The example indexing post placement module 59 depicted in FIG. 4A includes three indexing post holders 64 which are supported and spaced by a set of three rigid spacer bars 62. The spacer bars may be connected or integrally formed to form a rigid frame that supports the indexing post holders 68. Each indexing post holder 68 is configured to latch onto and hold a respective indexing post 64 and later release the indexing post 64. Each indexing post holder 68 is connected to a respective vacuum pump 66 via a respective flexible tube 70. As explained in more detail below, vacuum pressure produced by each vacuum pump 66 induces the associated indexing post 64 to adhere to the surface 9. The vacuum pumps 66 are shown mounted to the spacer bars 62, but may be mounted to the indexing post holders 68. One of the spacer bars 62 is coupled to the spacer bar support frame 60.

Figure 5A:
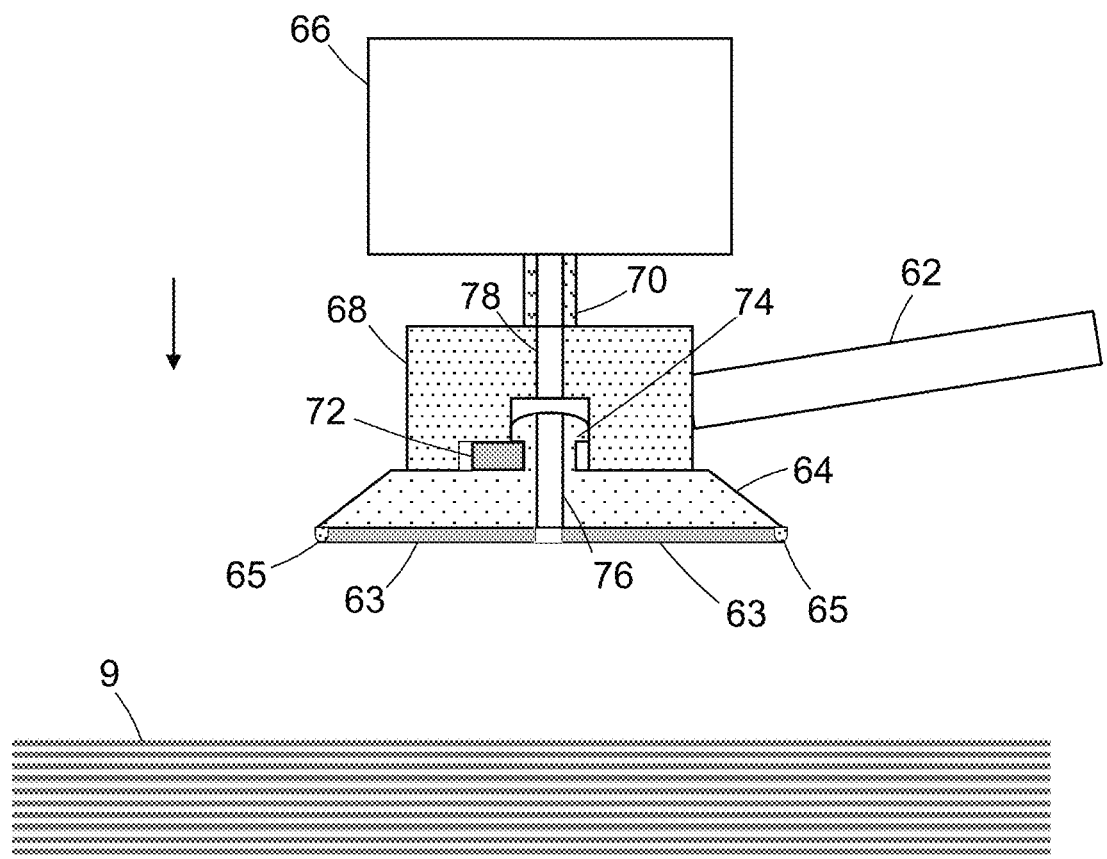

FIGS. 5A-5F are diagrams representing partly sectional side views of an indexing post 64 at six stages during a process for adhering the indexing post to a surface of a target object in accordance with the embodiment depicted in FIGS. 4A-4C. In FIG. 5A, the indexing post 64 is held and supported by an indexing post holder 68 having a latch 72 which interlocks underneath a catch head 74 of the indexing post 64. The arrow in FIG. 5A indicates that the indexing post holder 68 is moving toward a surface 9 of a composite laminate. In the state depicted in FIG. 5A, placement of latch 72 underneath catch head 74 prevents the indexing post 64 from separating from the indexing post holder 68. As seen in FIG. 5A, the external face of the indexing post 64 is covered by a layer of pressure-sensitive adhesive material 63 bounded along a perimeter by an edge seal 65 made of elastomeric material (e.g., silicone rubber). In addition, indexing post 64 has a channel 76 which is in direct flow communication with a channel 78 formed in the indexing post holder 68 and an opening in the layer of pressure-sensitive adhesive material 63. The channel 78 in turn is in flow communication with the vacuum pump 66.

Figure 5B:
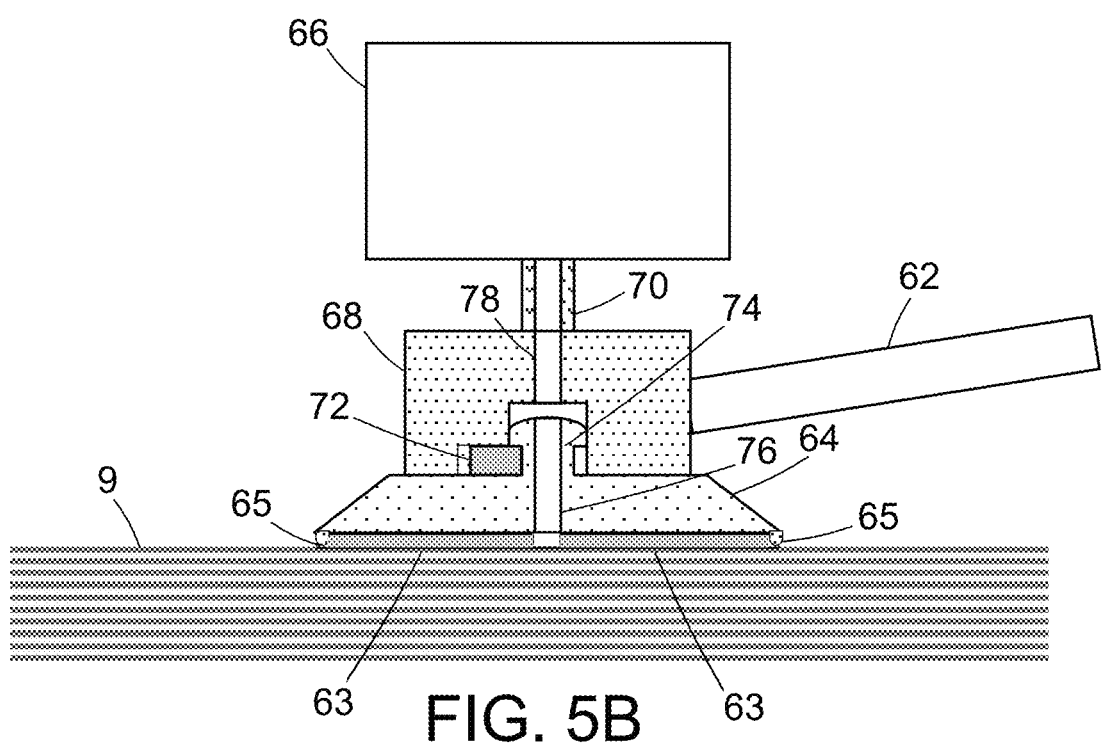

The flight controller of the UAV 2 then controls the UAV rotors to cause UAV 2 to fly along a path that brings the adhesive underneath the indexing posts 64 into contact with the surface 9 at the respective positions seen in FIG. 4B. One example of an indexing post 64 in contact with surface 9 is shown in FIG. 5B. While the indexing post 64 is in the position depicted in FIG. 5B, the vacuum pump 66 is activated by the flight controller or by a separate process controller (not shown in FIGS. 5A-5F) to produce a vacuum pressure inside channel 76 and 78. The arrows in channels 76 and 78 seen in FIG. 5C represent the flow of air into the vacuum pump, which flow causes partial evacuation of the space between indexing post 64 and surface 9, which intervening space is bounded by edge seal 65. The resulting vacuum pressure in the sealed space between indexing post 64 and surface 9 causes the pressure-sensitive adhesive material 63 to press against the surface 9, thereby activating the pressure-sensitive adhesive. In the state depicted in FIG. 5C, the indexing post 5C is adhered to surface 9.

Figure 5D:
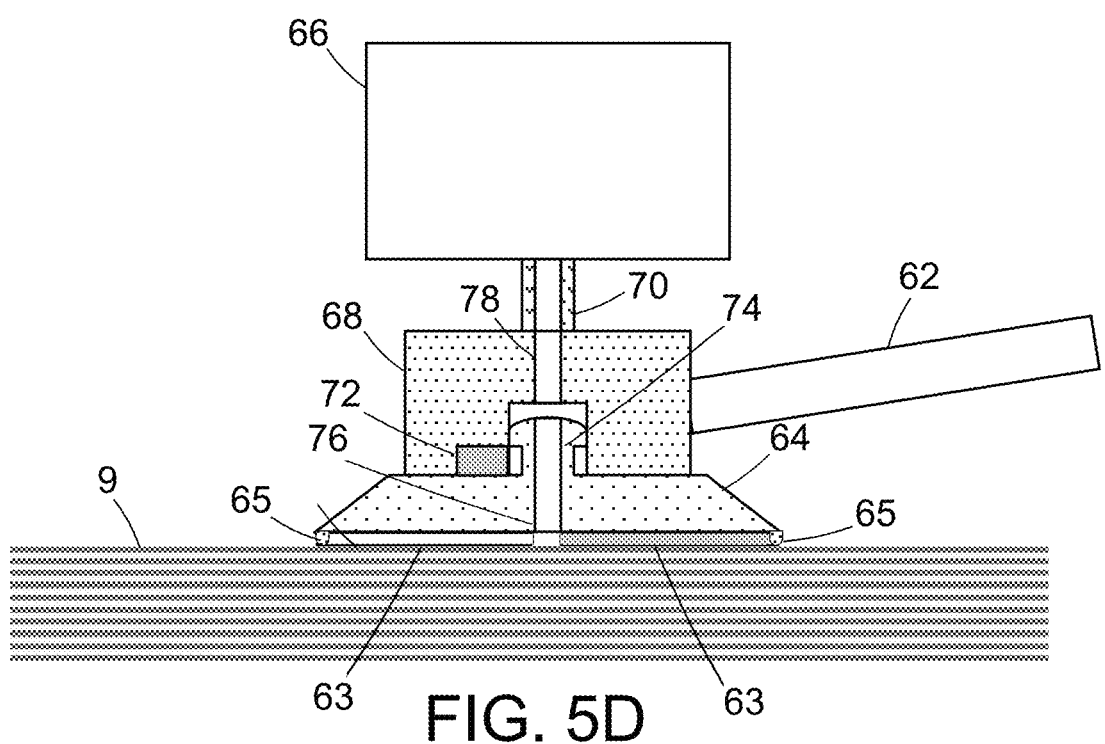
Figure 5E:
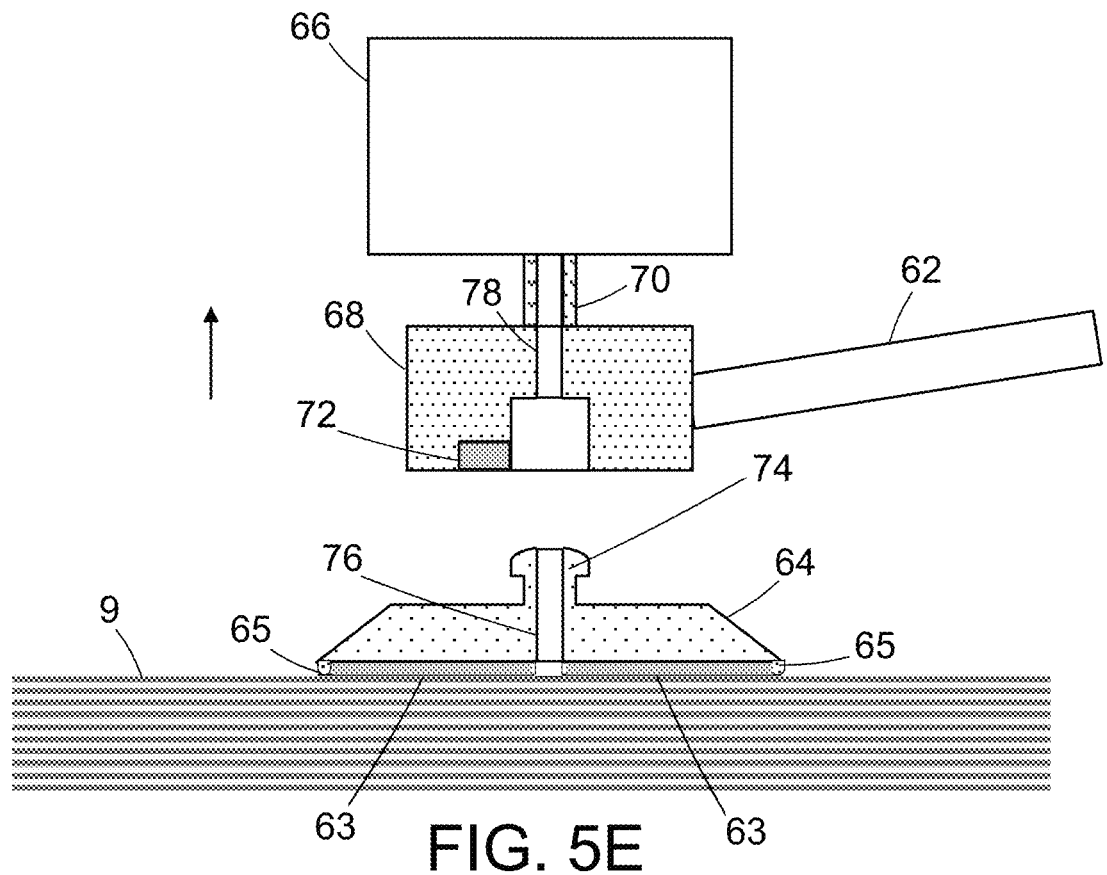
Figure 5F:
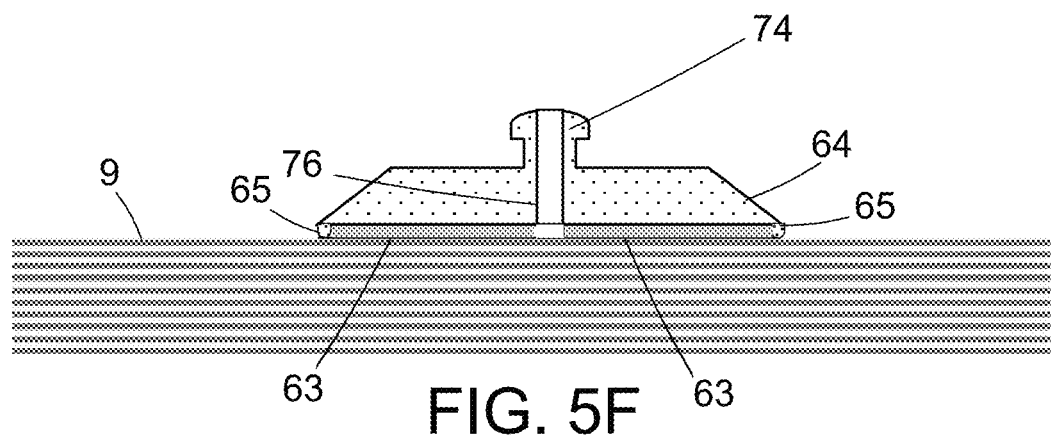

The next step in the attachment process is to unlatch the indexing post 64 from the indexing post holder 68 by moving latch 72 from the latched position depicted in FIG. 5C to the unlatched position depicted in FIG. 5D. The flight controller of the UAV 2 then controls the rotors in a manner that enables the indexing post holders 68 to separate from the indexing posts 64, as depicted in FIG. 5E. The arrow in FIG. 5E indicates that the indexing post holder 68 is moving away from surface 9. In the state depicted in FIG. 5E, the indexing post 64 is adhered to the surface 9. The indexing post 64 may stay attached to the surface 9 as depicted in FIG. 5F for use in subsequent UAV-enabled hot bond repair operations.

Figure 6:
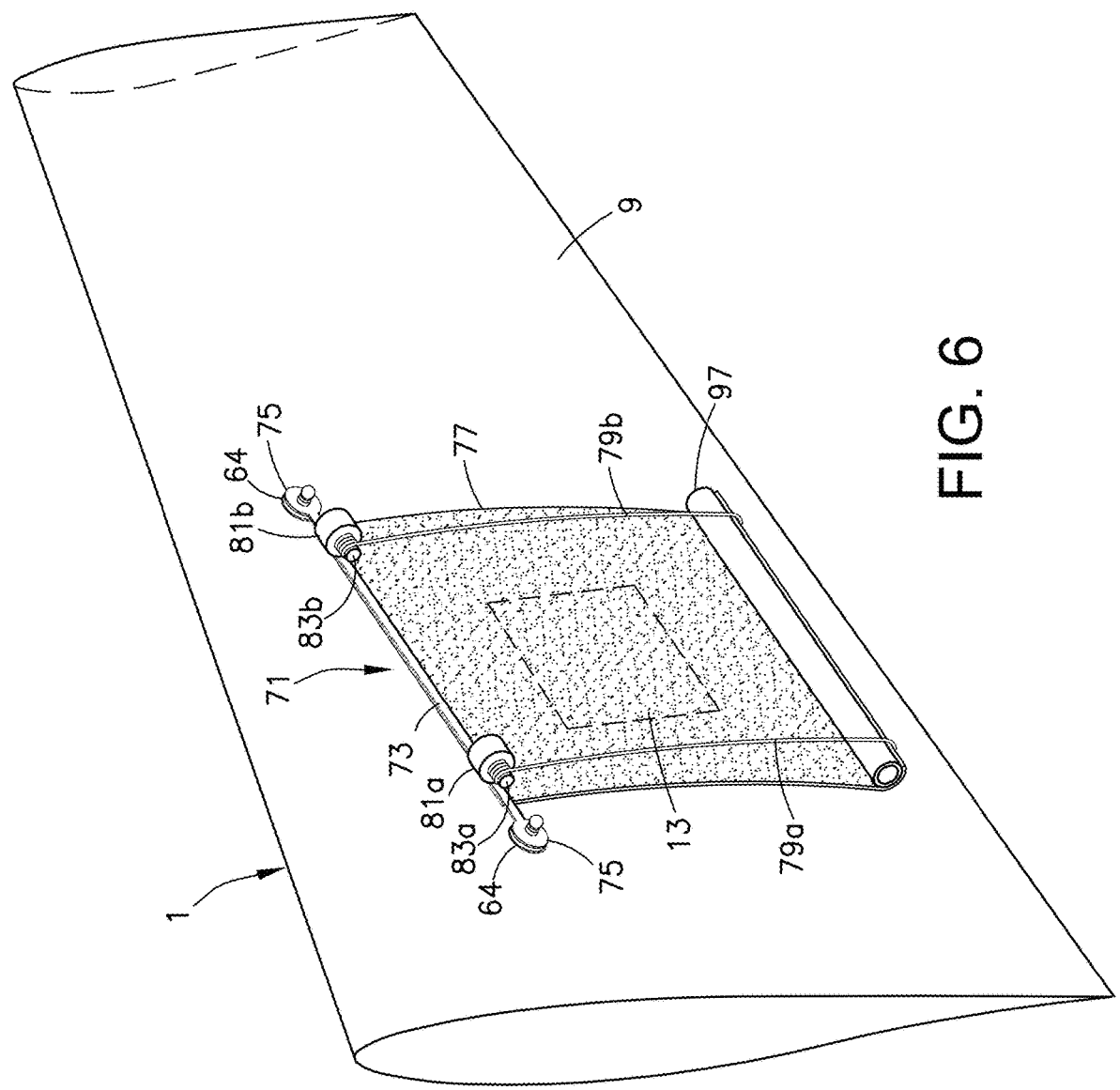
FIG. 6 is a diagram representing a three-dimensional view of an indexing post-supported retractable/extendible cover sheet draped over a repair area on a surface of a target object in accordance with one embodiment.

Optionally, the repair area 13 may be protected from foreign object debris/contamination by a retractable/extendible cover sheet during any lull in UAV-enabled repair operations. FIG. 6 is a diagram representing a three-dimensional view of an indexing post-supported retractable/extendible cover sheet 77 (hereinafter "cover sheet 77") draped over a repair area 13 on a surface 9 of a target object 1 in accordance with one embodiment. The cover sheet 77 is part of a cover sheet module 71 which is hung on multiple indexing posts 64 by a UAV not shown. The indexing posts 64 are adhered to the surface 9 at respective positions selected to achieve full coverage of repair area 13 when cover sheet 77 is extended (as shown in FIG. 6). The cover sheet module 71 includes a cover sheet rod 73 having annular rod ends 75 that fit onto respective indexing posts 64. In accordance with one embodiment, a video locating system uses a video camera onboard the UAV and image comparison software to guide the UAV to align the annular rod ends 75 with the indexing posts 64 during installation of the cover sheet module 71. The indexing posts 64 and annular rod ends 75 are configured to allow another repair tool (such as the repair patch module described below) to latch onto the indexing posts 64 while the annular rod ends 75 remain between the latches of the other repair tool and the bases of the indexing posts 64.

Figure 8:
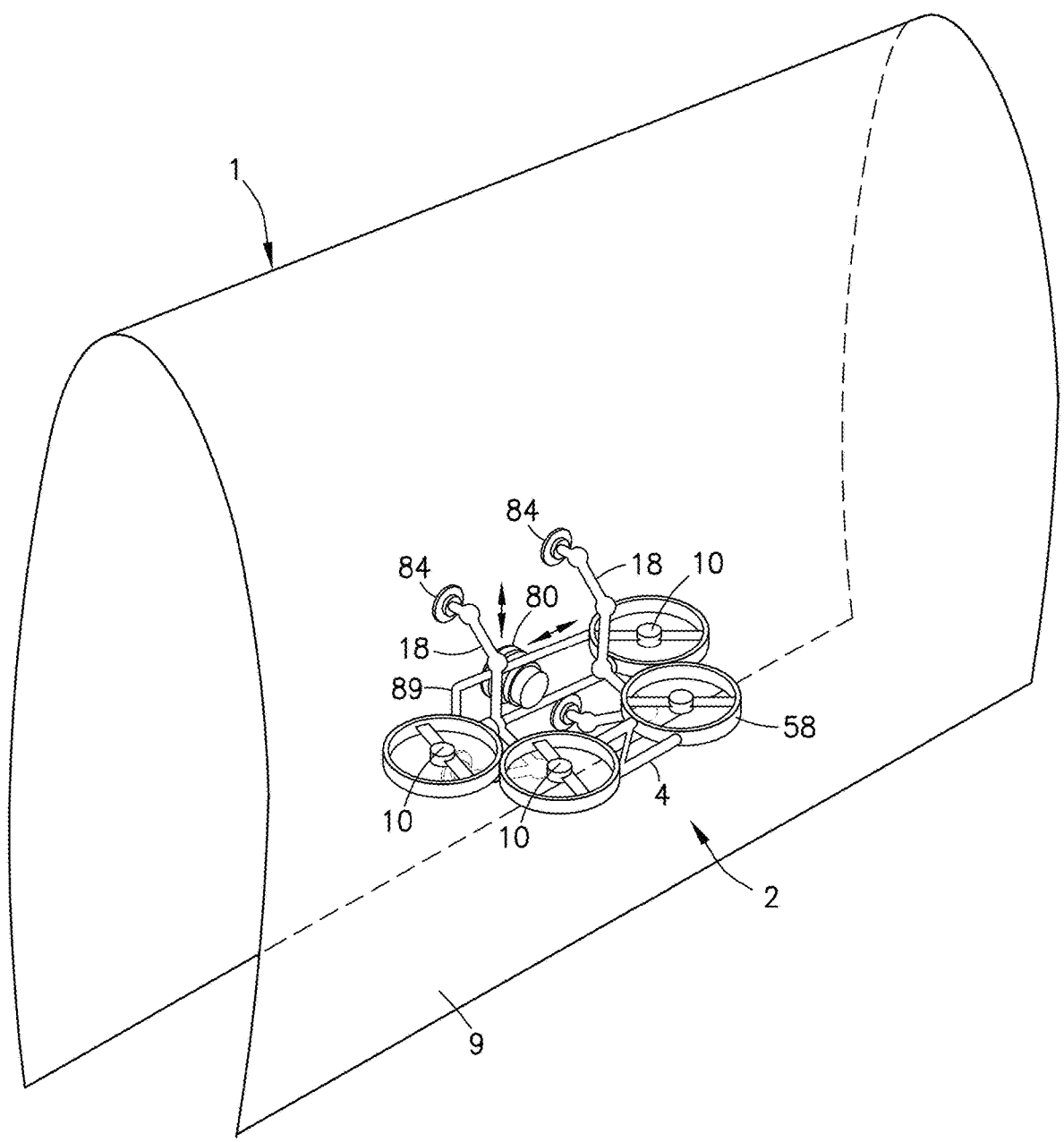
FIG. 8 is a diagram representing a three-dimensional view of a sander-equipped UAV which is sanding an area on a surface of a target object in accordance with another embodiment.

The cover sheet module 71 further includes a pair of spool motors 81a and 81b mounted to the cover sheet rod 73. The spool motors 81a and 81b are operatively coupled to drive rotation of respective spools 83a and 83b. The cover sheet module 71 also includes a circular cylindrical roll 97 which is attached to a bottom margin of the cover sheet 77 and a pair of cords 79a and 79b which are arranged to enable the circular cylindrical roll 97 to be lowered or raised, in which cases the cover sheet 77 will be extended (rolled out) or retracted (rolled up) respectively. In accordance with one proposed implementation, one end of cord 79a is attached to spool 83a and the other end of cord 79a (not visible in FIG. 6) is attached to cover sheet rod 73, while the cord 79a is slung under (and not attached to) the circular cylindrical roll 97, as seen in FIG. 8. Similarly, one end of cord 79b is attached to spool 83b and the other end of cord 79b (not visible in FIG. 6) is attached to cover sheet rod 73, while the cord 79b is slung under (and not attached to) the circular cylindrical roll 97. A controller (not shown in FIG. 6) is configured to control the operation of spool motors 81a and 81b in response to commands received via wireless communication. The spool motors 81a and 81b are controlled so that spools 83a and 83b rotate at the same rotational speed either in one direction that causes the cover sheet 77 to extend or in the opposite direction that causes the cover sheet 77 to retract. FIG. 8 shows the cover sheet 77 fully extended and covering the repair area 13.

The surface 9 in the repair 13 may require preparation prior to hot bonding of a repair patch to the repair area 13. First, a surface preparation module is coupled to a UAV at the maintenance depot. The UAV that carries the surface preparation module is configured differently than the first UAV (shown in FIG. 4A) that carries indexing post placement module 59. Likewise the UAV (not shown in the drawings) that carries the cover sheet module 71 is configured differently. The UAV that carries the surface preparation module is flown to a location where the surface preparation module is adjacent to the area to be repaired. The surface of the structure in the repair area is prepared using the surface preparation module. Upon completion of the surface preparation operation, the UAV carries the surface preparation module away from the surface of the structure.

As previously described with reference to FIG. 3 (see step 210), surface preparation may include sanding of the repair area. More specifically, paint and primer may be removed from the repair area 13, plus at least 2 inches on all sides, using fine abrasive. Also the area around the anomaly is scarfed (sanded) to a depth sufficient to clean out the anomalous material and prepare a surface for the repair plies. The scarfing is done mechanically using various grits of sandpaper and diamond or carbide grit cutting wheels. The sander sands in a circular, oblong, oval, or semicircular pattern based on the defect configuration and location. In accordance with one set of specifications, the composite material should be scarfed at a nominal slope of a 30 to 1 ratio (the ratio of the taper length to depth) with an allowable range between 28 to 1 and 32 to 1. A scarfing map comprising rings indicating the respective increasing diameters of a stack of circular plies may be generated. For a particular composite material, the maintenance database will include nominal ply thicknesses for tape and for fabric. These ply thicknesses are designed to produce respective specified scarfed ply widths. If the above nominal ply thicknesses are not satisfactory for an individual repair situation, the repair expert can specify an appropriate ply thickness to be used. The scarfed areas should have a smooth transition from ply to ply with minimum waviness. The actual taper line will not be perfectly straight. The scarfing specifications typically include a maximum deviation from straight.

In accordance with one embodiment, a sander may be incorporated in a sanding module (not shown in the drawings) that is carried by the UAV 2 and placed on the indexing posts 64 seen in FIG. 4C. The sanding module may be decoupled from the UAV 2 and vacuum adhered to the surface 9 of the target object 1. During sanding, the vacuum adherence exerts a normal pressure that increases the friction between the sanding pad and surface area being sanded. In accordance with other embodiments shown in FIGS. 7 and 8, the sander may remain coupled to the UAV 2 during sanding, in which cases the UAV 2 moves the sanding pad and exerts a thrust normal to the surface 9 to increase the friction forces produced by the rotating sanding pad.

Figure 7:
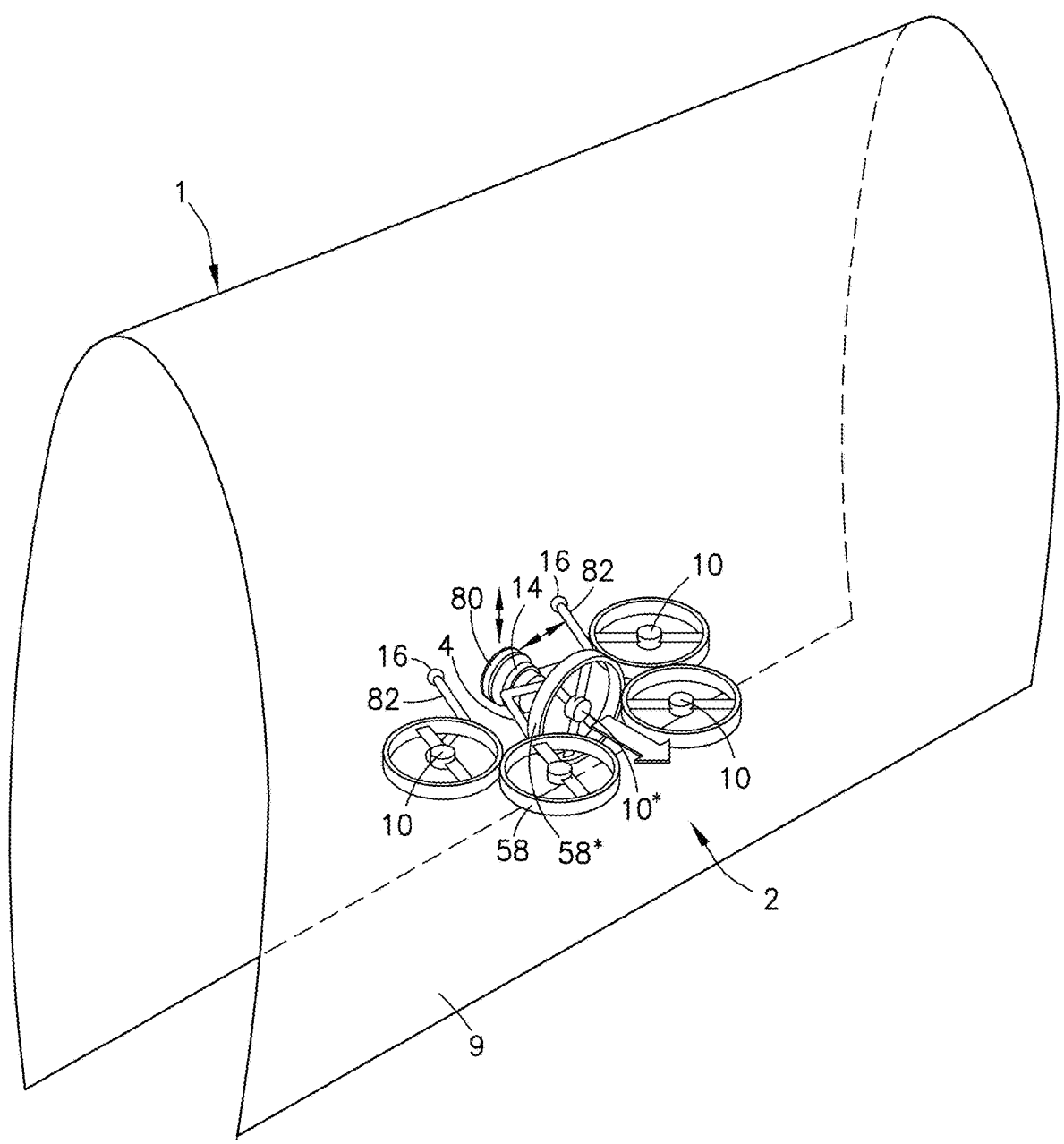
FIG. 7 is a diagram representing a three-dimensional view of a sander-equipped UAV which is sanding an area on a surface of a target object in accordance with one embodiment.

FIG. 7 is a diagram representing a three-dimensional view of a sander-equipped UAV 2 in accordance with one embodiment. FIG. 7 shows only some components of UAV 2, including only a portion of a body frame 4. In addition to the body frame 4, the UAV 2 depicted in FIGS. 4A-4C includes a rotor system consisting of rotors 10 and 10*, rotor motors (not shown), and a controller (not shown). The plurality of rotors includes four vertical rotors 10 having axes of rotation which are parallel and one normal rotor 10* having an axis of rotation perpendicular to the axes of rotation of vertical rotors 10. A sander 80 is rotatably mounted to the body frame 4 of UAV by means of a gimbal pivot 14. In addition, the system includes four oleo struts 82 (only two struts are shown in FIG. 7) having proximal ends coupled to the body frame 4 of the UAV 2 and distal ends coupled to respective standoff contact feet 16 which contact the surface 9 during a scarfing operation. (An oleo strut is an air-oil pneumatic-hydraulic shock absorber that damps out axial oscillations.) The sanding pad may be swapped out for a cleaning pad upon completion of the scarfing operation, which cleaning pad may be used to clean away surface debris produced during sanding.

The sanding system depicted in FIG. 7 includes a limited-depth sanding pad to ensure proper depth of material removal. A light sanding pressure is exerted by the sander in reaction to a normal thrust produced by rotation of the normal rotor in a direction that propels air away from the surface 9 (which rearward airflow is indicated by the open arrow in FIG. 7). The oleo struts 82 retract (are compressed) due to the normal thrust exerted by the normal rotor 10*. In the retracted state, the oleo struts 82 damp oscillations, thereby stabilizing the position of the sander 80 relative to the surface 9. The gimbal pivot 14 ensures even pressure during sanding. The vertical rotors 10 propel the sander 80 across the surface 9. For example, the sander 80 may move up and down or sideways, as indicated by double-headed arrows in FIG. 7.

In order for UAV 2 with four vertical rotors 10 to rise into the air, a lifting force must be created which exceeds the force of gravity. The faster the rotors spin, the greater the lift and vice versa. The UAV 2 is capable of hovering, ascending or descending in a vertical plane. To hover, the net upward thrust of the four vertical rotors 10 must be exactly equal to the gravitational force being exerted on the UAV 2. The UAV 2 may ascend by increasing the thrust (speed) of the four vertical rotors 10 so that the upward force is greater than the weight of the UAV 2. The UAV 2 may descend by decreasing the rotor thrust (speed) so the net force is downward.

The tool-equipped UAVs disclosed herein are also capable of flying forward, backward, or sideways or rotating while hovering during the performance of a maintenance function. For example, in the case of a UAV having four fixed vertical rotors 10 as shown in FIG. 7, increasing the thrust produced by the rear pair of vertical rotors causes a hovering UAV 2 to pitch forward and fly forward. Similarly, increasing the thrust produced by the left pair of vertical rotors causes a hovering UAV 2 to roll to the starboard side and fly laterally rightward.

The maintenance methodology disclosed herein takes advantage of the UAV's mobility to "land" onto a surface of a structure, hover while contacting that surface, and then skim along the surface. Before, during and after skimming of the UAV 2 across the surface, the maintenance tool onboard the UAV is able to scan that surface (e.g., for the purpose of sanding). In accordance with the embodiment depicted in FIG. 7, in which the axes of rotation of the rotors 10 are fixed relative to the UAV body frame 4, the orientation of the UAV 2 may be changed by generating unequal individual rotor thrusts. In accordance with alternative embodiments, the axes of rotation of the rotors are variable relative to the UAV body frame.

In alternative embodiments, the sander 80 may be movable relative to the UAV body frame 4 while the UAV 2 remains stationary during the scarfing operation. FIG. 8 is a diagram representing a three-dimensional view of a UAV 2 having a body frame 4 to which a sander support frame is coupled. The sander support frame includes four standoff support members 18 (only two of which are visible in FIG. 8). A respective suction cup 84 is mounted to the distal end of each standoff support member 18. The standoff support members 18 form a standoff system that maintains the sander 80 in a standoff position relative to the surface being sanded. During execution of a scarfing mission, the UAV 2 is flown to the location depicted in FIG. 8 and then effectively attached to the surface 9 by partially evacuating the spaces underneath the suction cups 84. The vacuum pumps and tubing for partially evacuating the suction cups 84 are not shown in FIG. 8, but similar components are depicted in FIG. 4A. The sander 80 is mounted to a motorized X-Y scan bridge 89 that is operable for displacing the sander 80 along X and Y axes (indicated by double-headed arrows in FIG. 8) to achieve multiple sequenced motions. The suctions cups 84 create vacuum adherence forces that act to press the sander 80 against the surface 9, which normal force increases the friction between the rotating sanding pas and surface 9.

As previously described with reference to FIG. 3 (see step 212), surface preparation may also include drying of the scarfed area. In accordance with various embodiments, a drying module may be carried to the repair by a UAV 2, which drying module has a hood that is held over the repair area 13. Pulses of direct air spray (from a compressed gas container) may be activated to clear away any loose material on or around the repair area. If moisture ingress into the damage is suspected, an infrared thermographic (IRT) image is collected to determine whether moisture is present or not. Heat is generated on the surface of the repairable structure via a flash lamp or a warm air blower aimed at the surface. In one proposed implementation, the heat source is mounted inside the hood. The IRT image is collected using an infrared camera which is also mounted inside in the hood after the heat has been applied. If moisture is found, a small vacuum drawn under the hood over time may be applied to remove the moisture. Optionally, heat may be applied during this partial evacuation of the space under the hood. One or more follow-up IRT images can be taken to verify removal of the moisture. The hood controls the environment (temperature, moisture, and air velocity) adjacent to the repair area 13.

Figure 9:
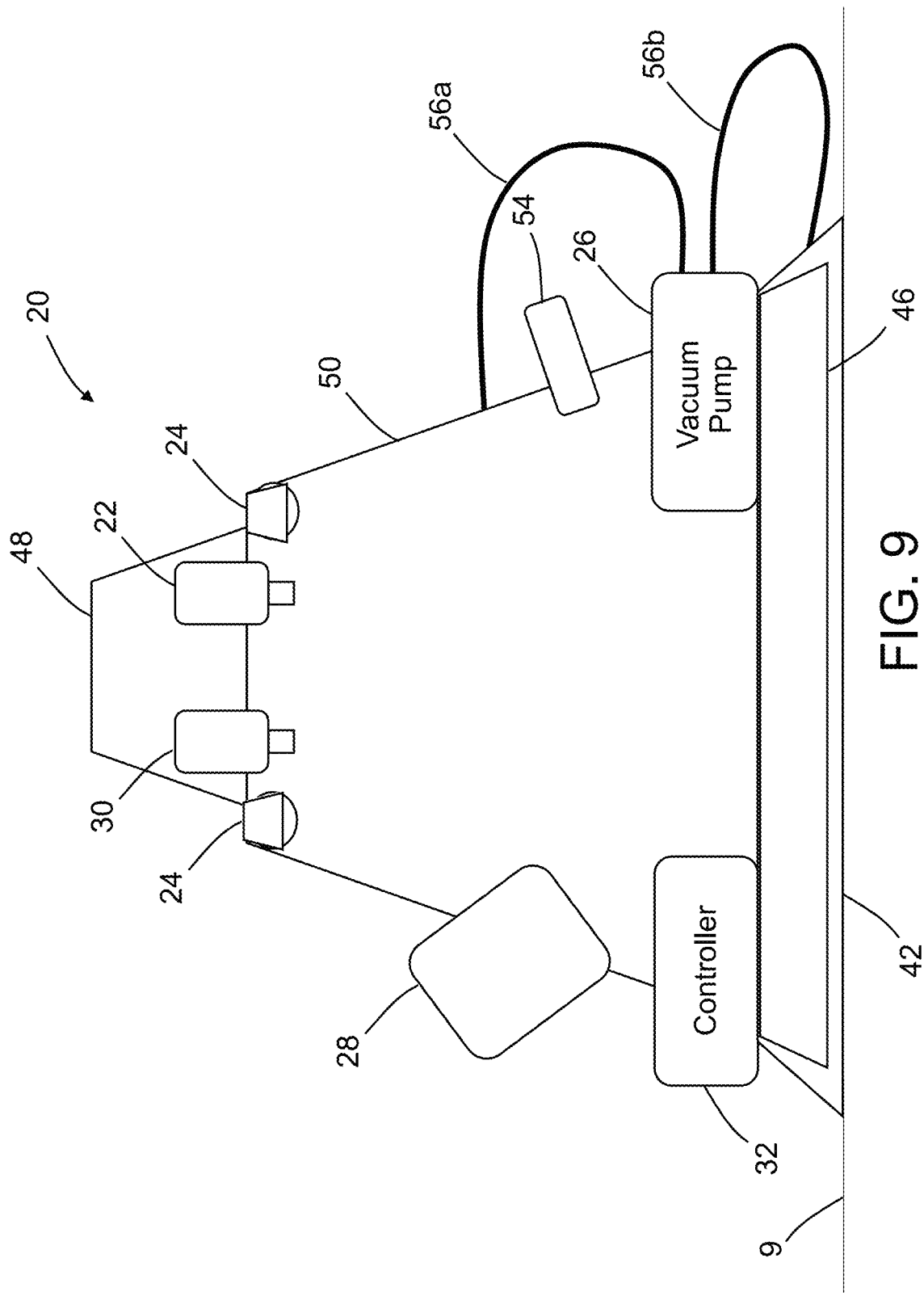
FIG. 9 is a diagram representing a side view of a drying module configured to perform a drying function in accordance with one embodiment, which drying module may be a payload carried by a UAV of the type depicted in FIG. 2 or a type having a different design.

FIG. 9 is a diagram representing a side view of a drying module 20 configured to perform a drying function in accordance with one embodiment, which drying module 20 may be a payload 6 carried by a UAV 2 of the type depicted in FIG. 2 or a type having a different design. The drying module 20 depicted in FIG. 9 includes a hood 50 and multiple components attached to the hood 50. The drying module 20 further includes an attachment point 48 which may be coupled to (and uncoupled from) the payload support frame 8 of the UAV 2 depicted in FIG. 2.

As seen in the proposed implementation depicted in FIG. 9, the hood 50 has an outer sealing lip 42 and an inner sealing lip 46 which facilitate vacuum adherence of the hood 50 to and removal of moisture from the repair area 13. The drying module 20 further includes an infrared camera 22, two or more heat lamps 24, and a video camera 30 all mounted to an upper portion of and extending at least partially into the space inside (under) the hood 50. The video camera 30 may be controlled to capture images of a surface of interest for inspection purposes. The infrared camera 22 may be controlled to capture images of the repair area 13 for the purpose of inspection or to detect moisture ingress in the area. The heat lamps 24 may be activated to heat the repairable surface for IRT imaging.

The drying module 20 depicted in FIG. 9 further includes a thermal radiation source 28 (also mounted to hood 50) that emits radiation (e.g., light or other electromagnetic radiation) for heating the repairable surface. In addition, an air nozzle 54 is installed in an opening formed in a wall of hood 50 for clearing away surface debris from the repair area 13. The drying module 20 further includes a vacuum pump 26 which is mounted to the exterior of hood 50. The vacuum pump 26 facilitates vacuum adherence of the hood 50 to and removal of moisture from the repairable surface. All of the hood-mounted components heretofore described operate under the electronic control of a controller 32, which may be mounted to a board attached to the exterior of hood 50. Electrical power to all electrically powered components may be provided via an electrical cable (not shown) or via a hood-mounted battery (not shown). In the case wherein electrically powered components receive electrical power from a power source on the ground via an electrical cable, the electrical cable may optionally also include wires for conducting electrical control signals from a ground station to the onboard controllers and conducting electrical sensor data signals from an onboard NDI sensor unit to the ground station.

In accordance with the embodiment depicted in FIG. 9, vacuum adherence of the hood 50 to the surface 9 may be accomplished by operation of the vacuum pump 26, which is in flow communication with the interior volume of space of hood 50 via a hose 56a and with the volume of space between the outer sealing lip 42 and inner sealing lip 46 via a hose 56b. The controller 32 is configured to control operation of a vacuum pump motor 27 (not shown in FIG. 9, but see FIG. 10) so that air is removed from the interior and inter-lip volumes of space. Both lips are flexible substrates, with the outer sealing lip 42 surrounding the inner sealing lip 46 with a volume of space therebetween. However, the outer sealing lip 42 is thicker to support the bulk suction. The inner sealing lip 46 is a thinner substrate. When the bottom edges of both lips are in sealing contact with surface 9, the volume of space between the lips may be partially evacuated to provide the primary suction method. Likewise the interior volume of space bounded by the inner sealing lip 46 and the remainder of hood 50 may be partially evacuated to provide a secondary suction method. The pressure in the volume of space between the lips will be lower than the pressure under the hood 50 due to pressure increase from heating of the surface under the hood 50—both pressures being less than the ambient pressure outside the hood 50, which pressure conditions are designed to generate the required vacuum adherence forces.

In accordance with an alternative drying method, the UAV 2 may carry a hot bond repair module having a heating blanket and a vacuum pump which may be used to heat the surface 9 under vacuum pressure for a specified period of time. The structure and functionality of such a hot bond repair module are described in more detail below with reference to FIGS. 11A-11C, 12, 13, 14A, 14B.

Figure 10:
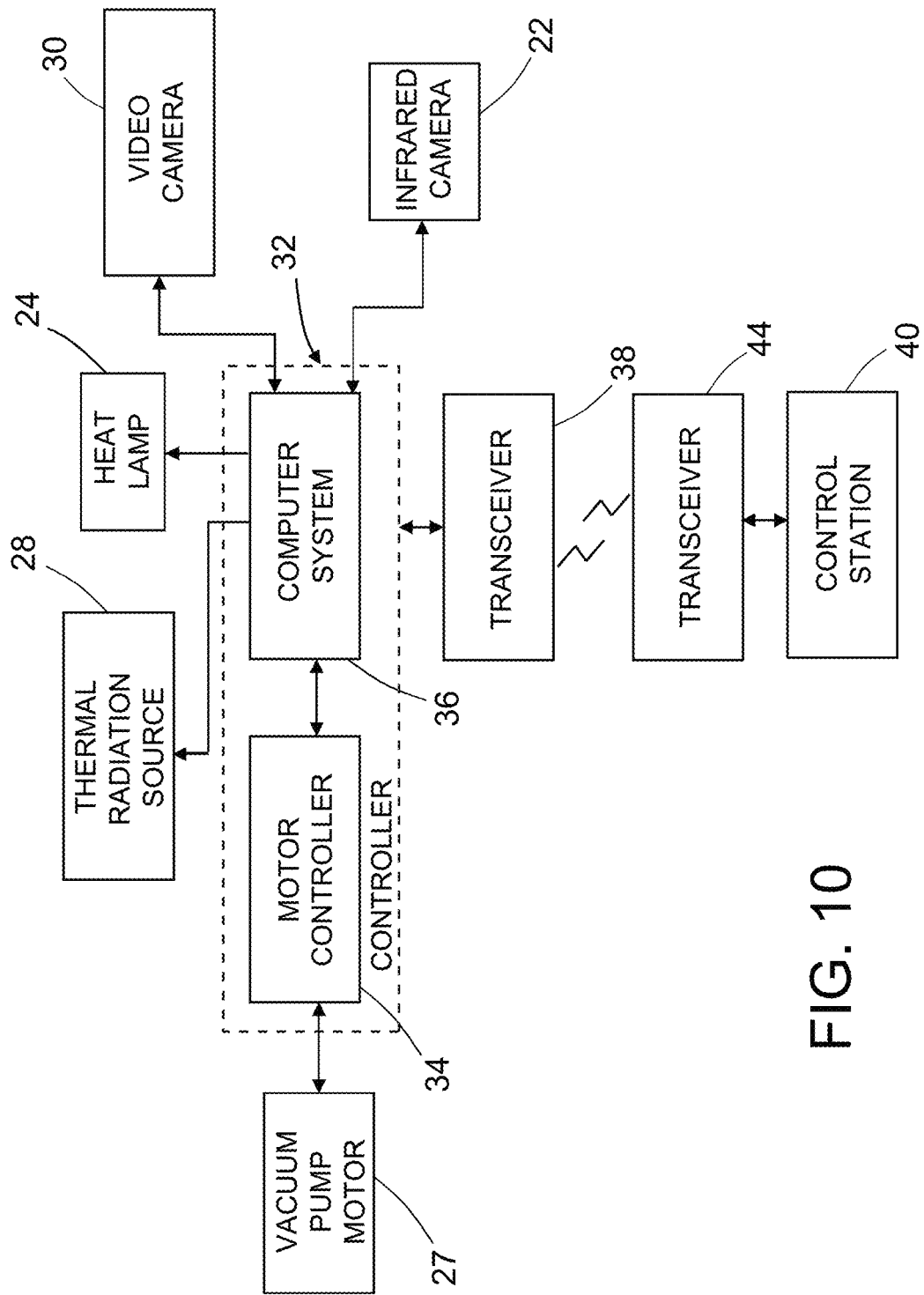
FIG. 10 is a block diagram identifying some components of a system for drying a surface on a remotely located target object, which system includes the drying module depicted in FIG. 9.

FIG. 10 is a block diagram identifying some components of a system for drying a surface 9 on a remotely located target object, which system includes the drying module 20 depicted in FIG. 9. As shown in FIG. 10, the controller 32 is communicatively coupled to all electrical components of the drying module 20. The controller 32 includes a computer system 36 (e.g., one or more processors communicatively coupled by a bus) and a motor controller 34 which is communicatively coupled to the computer system 36. The motor controller 34 is configured for controlling a vacuum pump motor 27 that is part of vacuum pump 26 shown in FIG. 9. The computer system 36 also controls operation of the infrared camera 22, heat lamp 24, thermal radiation source 28, and video camera 30. Although not shown in FIG. 10, the drying module 20 may further include relays having selectable switching states for respectively electrically coupling the heat lamp 28 and thermal radiation source 28 to the power source, in which case the controller 32 is further configured to control the switching states of the relays. The hood 50 may also have surface attachment devices, such as magnetic-based devices, e.g., an electro-permanent magnet, for ferromagnetic structures, and/or vacuum-based, electrostatic-based, adhesive-based, gripper-based devices for non-ferromagnetic structure. The surface attachment devices also operate under the control of the computer system 36.

In the embodiment partly depicted in FIG. 10, the infrared camera 22, heat lamp 24, thermal radiation source 28, and video camera 30 are controlled by the computer system 36 as a function of radiofrequency commands transmitted by a control station 40 on the ground. Those radiofrequency commands are transmitted by a transceiver 44 on the ground, received by a transceiver 38 incorporated in the drying module 20 (or on-board the UAV 2), and converted by the transceiver 38 into the proper digital format. The resulting digital commands are then forwarded to the computer system 36. The control station 40 may comprise a general-purpose computer system configured with programming for controlling operation of the UAV 2 and the drying module 20. For example, the flight of the UAV 2 can be controlled using a joystick, keyboard, mouse, touchpad, or touchscreen of a computer system at the control station 40 or other user interface hardware (e.g., a gamepad or a pendant). In addition, the computer system at the control station 40 is configured with programming for processing data received from the UAV 2 during an inspection operation. In particular, the computer system of the control station 40 may comprise a display processor configured with software for controlling a display monitor (not shown in FIG. 10) to display images acquired by the video camera 30 or infrared camera 22.

As previously described with reference to FIG. 3 (see step 220), the hot bonding repair process proposed herein may also include thermal profiling of the repair area 13. As used herein, the term "thermal profiling" (a.k.a., "thermal survey") refers to a test run (e.g., test heating/curing) of the repair setup. The thermal profiling may include heating a composite patch to a certain temperature using a heating blanket and monitoring various temperature sensors (e.g., thermocouples placed between the plies of the composite). The thermal profiling may aid in determining whether the current repair setup will lead to an acceptable final curing process. For example, a thermal profiling may aid in determining whether the entire patch and/or repair area will heat appropriately; in other words, whether an appropriate or desired heating profile will be achieved. For some particular heating profiles, various structural areas (e.g., areas of the aircraft component) of the repair area may heat to a temperature level that is appropriate for the structural area. For example, areas where the structure is thicker (e.g., a thicker wall of an aircraft component) may ideally be adjusted to be hotter and areas where the structure is thinner may ideally be adjusted to be cooler. In some situations patch thickness may vary, which may be compensated for in the heating profile.

A test patch (or "surrogate patch") may be prepared to perform the thermal survey. The test patch may be similar to the repair patch that will be used. The test patch may be used to test the heating profile of the current repair setup. The test patch may be cut and applied to the repair area (e.g., the scarfed area). A number of control thermocouples may be placed around or near the perimeter of the repair area and/or in or on the test patch. The thermocouples provide temperature feedback during a thermal survey, which information is used to confirm that the heating profile appears to be acceptable across the entire repair area 13.

The thermal survey may be completed by performing a test heating using a UAV that carries a surrogate patch ensemble comprising a surrogate patch adhered to a heating blanket. The heating blanket is placed over the repair area with the surrogate patch therebetween. Then the heating blanket is used to heat the surrogate patch to a specified temperature (e.g., 350° F. for some composite materials). If temperature information from the thermocouples during the thermal survey appears to show an appropriate heating profile, the same or a similar repair setup may be used for the final curing process. If areas of the heating profile appear to be outside of acceptable temperature ranges, a technician may make adjustments to the repair/heating setup/configuration, with the goal of ensuring that all thermocouples are within acceptable temperature ranges during the thermal survey. Once adjustments have been made, the thermal survey may be performed again (or continued), e.g., the heating blanket temperature may be ramped up again (or maintained), and temperature readings from the thermocouples may be analyzed again.

As previously described with reference to FIG. 3 (see step 228), a repair patch is hot bonded to the composite repair area 13 using a UAV 2. The repair patch is constructed to match a surrogate patch that had an acceptable thermal profile. In accordance with one embodiment, the repair patch 3 includes a stack of composite repair plies having specified fiber orientations designed to achieve a desired strength. The repair patch 3 may be sized and shaped to match a repair area 13 that has been scarfed to have matching size and shape. The repair patch is carried to the repair site and applied to the repair area 13 by an apparatus that includes the UAV 2, a payload support frame that is pivotably coupled to the UAV 2, and a patch applicator supported by the payload support frame. One embodiment of such an apparatus for UAV-enabled hot bonding repair of a damaged surface of a difficult-to-access structure will now be described. The same apparatus may be used to carry and support a surrogate patch.

Figure 11A:
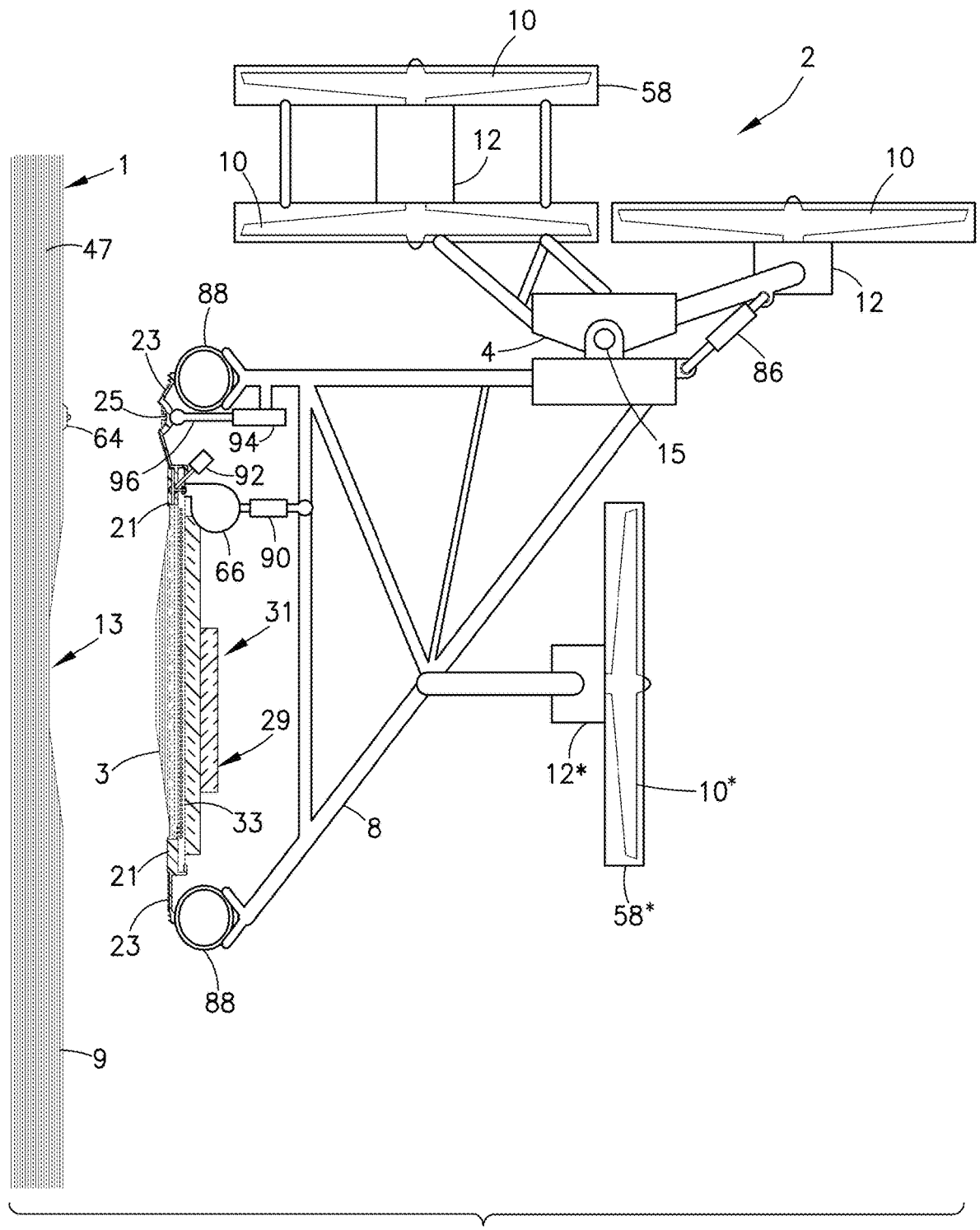
FIGS. 11A-11C are diagrams representing respective partly sectional side views of a payload-carrying UAV at three stages during execution of a process for bonding a repair patch on a surface of a target object in accordance with one embodiment. The payload is a repair patch ensemble that includes a patch applicator and a repair patch vacuum adhered to the patch applicator.
Figure 11B:
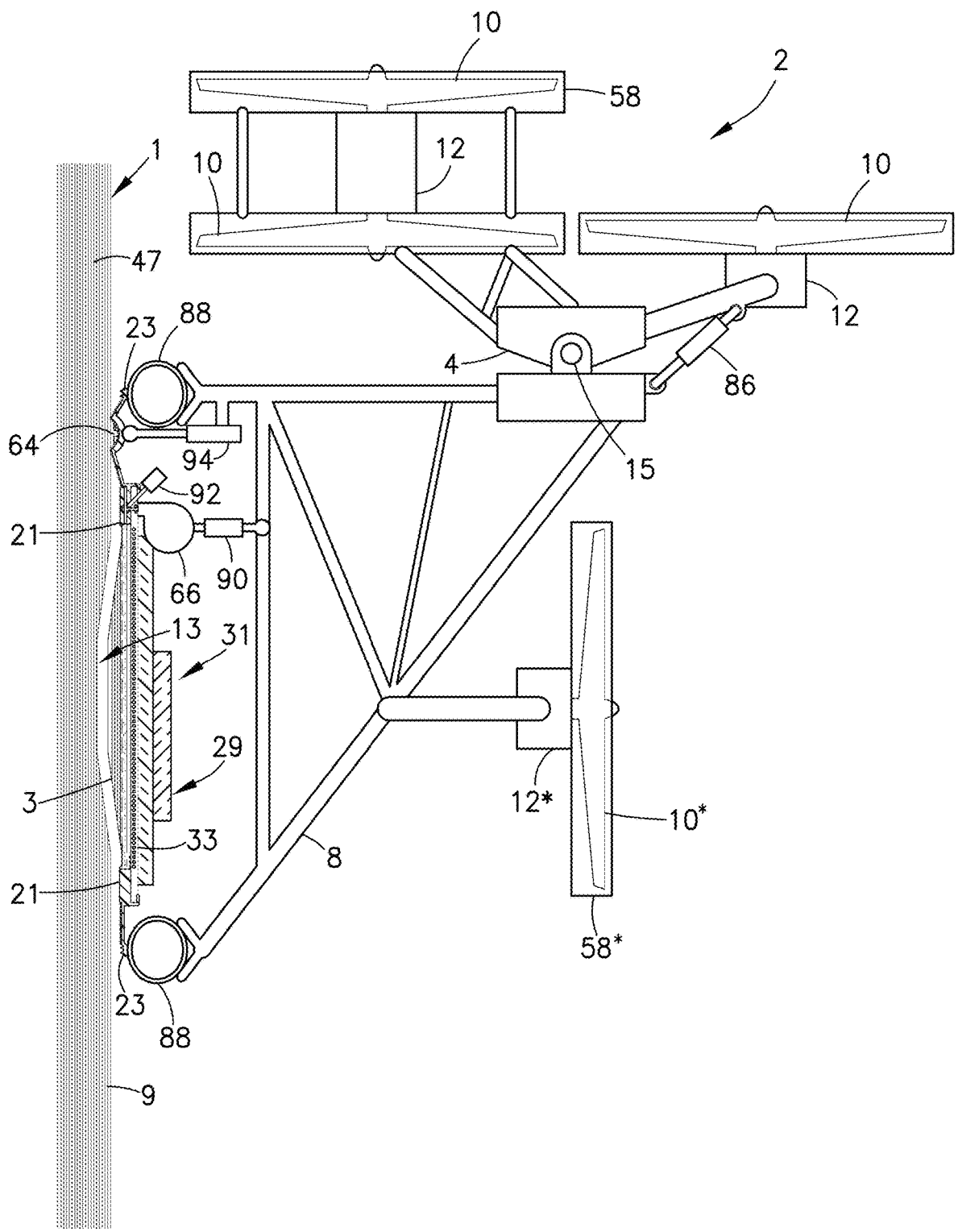
Figure 11C:
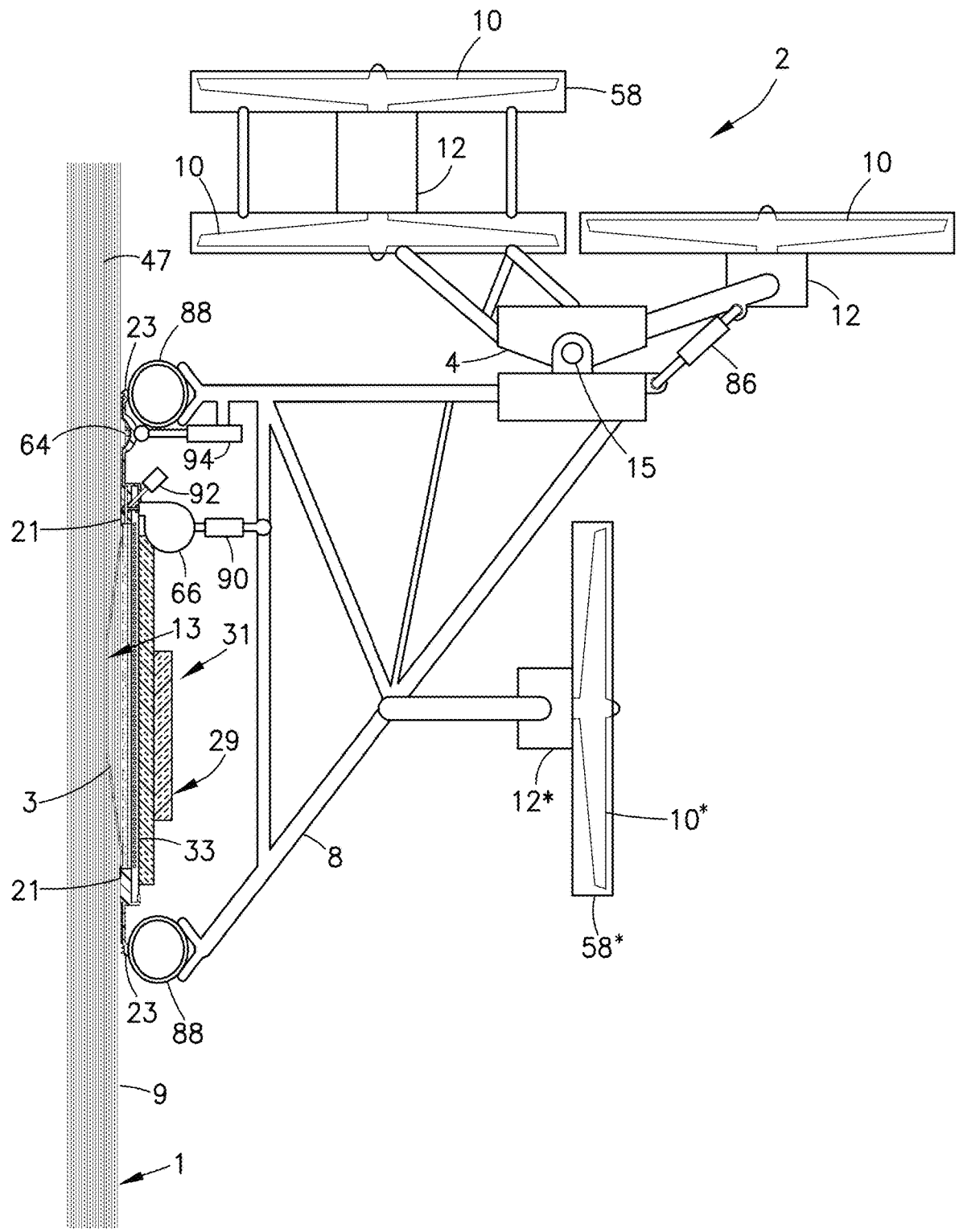

FIGS. 11A-11C are diagrams representing respective partly sectional side views of a repair patch application apparatus at three stages during execution of a process for bonding a repair patch 3 on a surface 9 of a target object 1 in accordance with one embodiment. The portion of target object 1 depicted in FIGS. 11A-11C is a substrate in the form of a composite laminate (consisting of a stack of repair plies 47) which has been scarfed in the repair area 13. The repair patch application apparatus depicted in FIGS. 11A-11C includes a UAV 2 having a body frame 4, a payload support frame 8 which is pivotably coupled to the body frame 4, and a payload which is coupled to the payload support frame 8 by an inflatable bladder 88. The payload includes a patch applicator 31 (described in more detail below with reference to FIGS. 12, 13, 14A, and 14B). During UAV flight and hot bonding, the repair patch 3 is vacuum adhered to the patch applicator 31. When the repair patch 3 is vacuum adhered to the patch applicator 31, their combination is referred to herein as "a repair patch ensemble". The repair patch is released by the patch applicator 31 after repair patch 3 has been adhesively bonded to repair area 13.

At the stage depicted in FIG. 11A, the UAV 2 is in flight at a location in the vicinity of the repair area 13, but the repair patch 3 is separated from and not yet in contact with the repair area 13. At the stage depicted in FIG. 11B, the UAV 2 is hovering at a location where the patch applicator 31 engages and is coupled to a plurality of indexing posts 64 (only one indexing post 64 is shown in FIGS. 11A-11C). The indexing posts 64 are positioned and the patch applicator 31 is configured so that when the indexing posts 64 are engaged by the patch applicator 31, the repair patch 3 (adhered to the patch applicator 31) is aligned with the repair area 13. As seen in FIG. 11B, the repair patch 3 is separated from the repair area 13, but the separation distance is smaller than the separation distance seen in FIG. 11A. At the stage depicted in FIG. 11C, the repair patch 3 is in contact and mated with the repair area 13. In this state, the repair patch 3 is in proper position to be hot bonded to the repair area 13.

Referring again to FIG. 11A, the UAV 2 includes a body frame 4 and a plurality of vertical rotors 10 rotatably coupled to the body frame 4. Each vertical rotor 10 is surrounded by a respective deflector ring 58 and is driven to rotate by a respective vertical rotor motor 12 mounted to body frame 4.

The repair patch application apparatus depicted in FIG. 11A further includes a payload support frame 8 which is pivotably coupled to the body frame 4 by means of a pivot 15 and a patch applicator 31 which is coupled to the payload support frame 8 by means of inflatable bladder 88. The repair patch application apparatus further includes a normal rotor 10* which is rotatably coupled to the payload support frame 8. The normal rotor 10* is surrounded by a deflector ring 58* and is driven to rotate by a normal rotor motor 12* mounted to payload support frame 8. The normal rotor 10* may be rotated in a direction that produces a thrust sufficient to move the UAV 2 from the position seen in FIG. 11A to the position seen in FIG. 11B and thereafter impart side force until a vacuum seal is initiated between the patch applicator 31 and surface 9.

In addition, the apparatus depicted in FIG. 11A includes a linear actuator 86 having one end pivotably coupled to the body frame 4 of the UAV 2 and another end pivotably coupled to the payload support frame 8. The linear actuator 86 may be operated to control the angular position of payload support frame 8 relative to body frame 4. During flight of UAV 2 from the maintenance depot to the repair site, the linear actuator 86 may be retracted, which allows the center of mass of payload support frame 8 and structure supported thereby to determine the angular position of payload support frame 8. In contrast, when the UAV is hovering in the vicinity of target object 1 and attempting to align the repair patch 3 with the repair area 13, the linear actuator 86 may be extended to cause the payload support frame 8 to rotate about the pivot 15 (clockwise from the viewpoint presented in FIG. 11A) to the angular position depicted in FIG. 11A.

Figure 12:
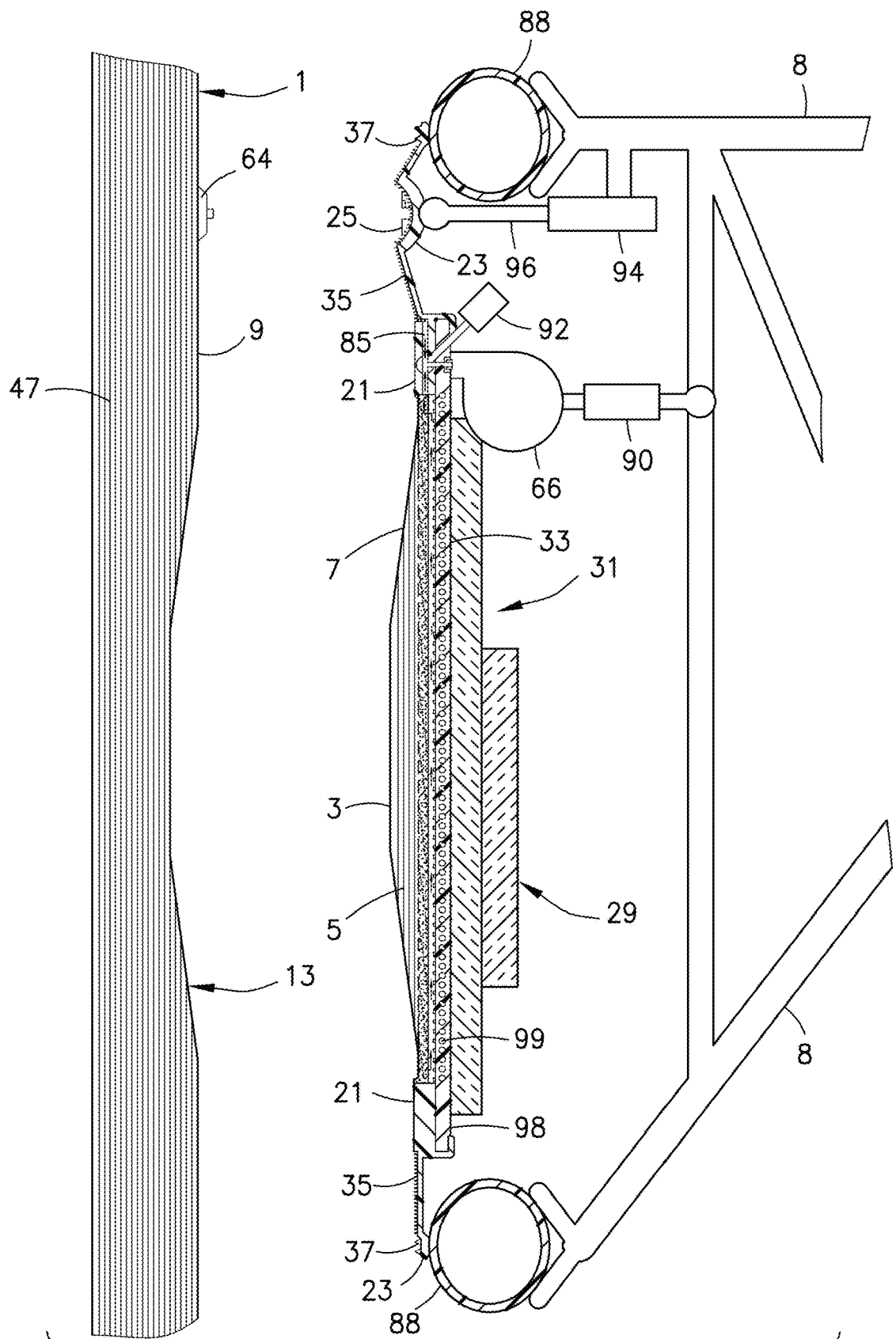
FIG. 12 is a diagram representing a magnified view of the repair patch adhered to the patch applicator and separated from the repair area as depicted in FIG. 11A.
Figure 13:
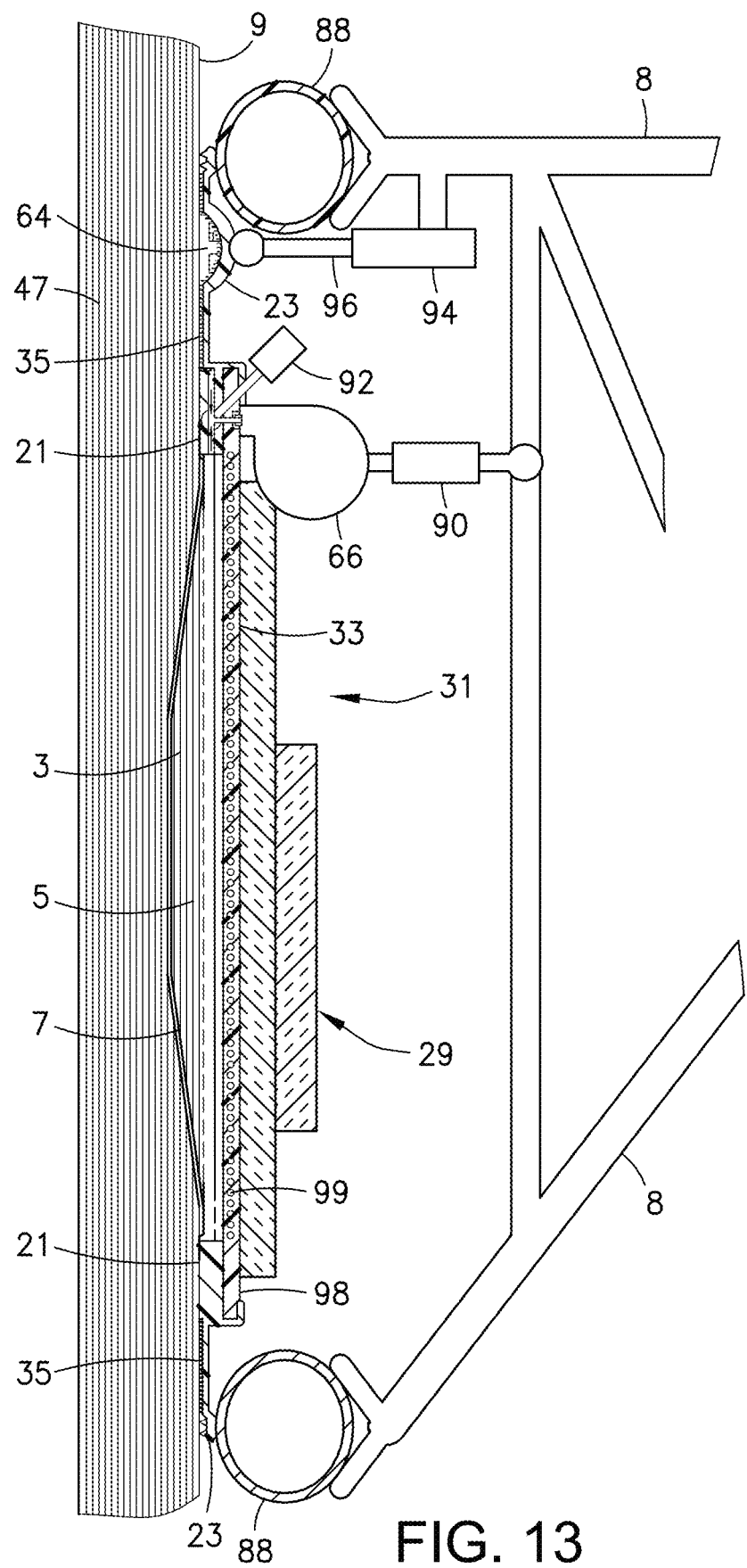
FIG. 13 is a diagram representing a magnified view of the repair patch adhered to the patch applicator and mated with the repair area as depicted in FIG. 11C.

FIG. 12 is a diagram representing a magnified view of the repair patch 3 adhered to the patch applicator 31 and separated from the repair area 13 as depicted in FIG. 11A. FIG. 13 is a diagram representing a magnified view of the repair patch 3 adhered to the patch applicator 31 and mated with the repair area 13 as depicted in FIG. 11C. As seen in FIGS. 12 and 13, the patch applicator 31 includes a heating blanket support frame 21 (coupled to the payload support frame 8) and a heating blanket 33 having a perimeter attached to and supported by the heating blanket support frame 21. The heating blanket 33 comprises a thermally conductive matrix 98 and a multiplicity of electrically resistive heating elements 99 (e.g., wires made of electrically conductive material) embedded in the thermally conductive matrix 98. As explained in more detail below, the repair patch 3 is effectively vacuum adhered to one side of the heating blanket 33. The other side of heating blanket 33 is covered by layers of thermal insulation 29. The placement and number of layers of thermal insulation 29 may be adjusted in dependence on the results of the above-described thermal survey. As indicated in FIG. 12, the heating blanket support frame 21 incorporates channels 85 which are in flow communication with a vacuum pump 66. The states of the channels 85 (opened or closed) are determined by a control valve assembly 92 (which is part of the patch applicator 31).

The vacuum pump 66 (which is also part of the patch applicator 31) is coupled to the payload support frame 8 by means of a spring suspension system 90.

The patch applicator 31 further includes a flexible flange 23 that is configured to form a vacuum seal with surface 9. The flexible flange 23 has an inner perimeter which is attached to or integrally formed with an outer perimeter of the heating blanket support frame 21. The flexible flange 23 also has an outer perimeter which is attached to the inflatable bladder 88. An edge seal 37 is integrally formed with the outer perimeter of the flexible flange 23. The partially inflated bladder 88 ensures evenly applied normal force to initiate the edge seal.

Figure 14A:
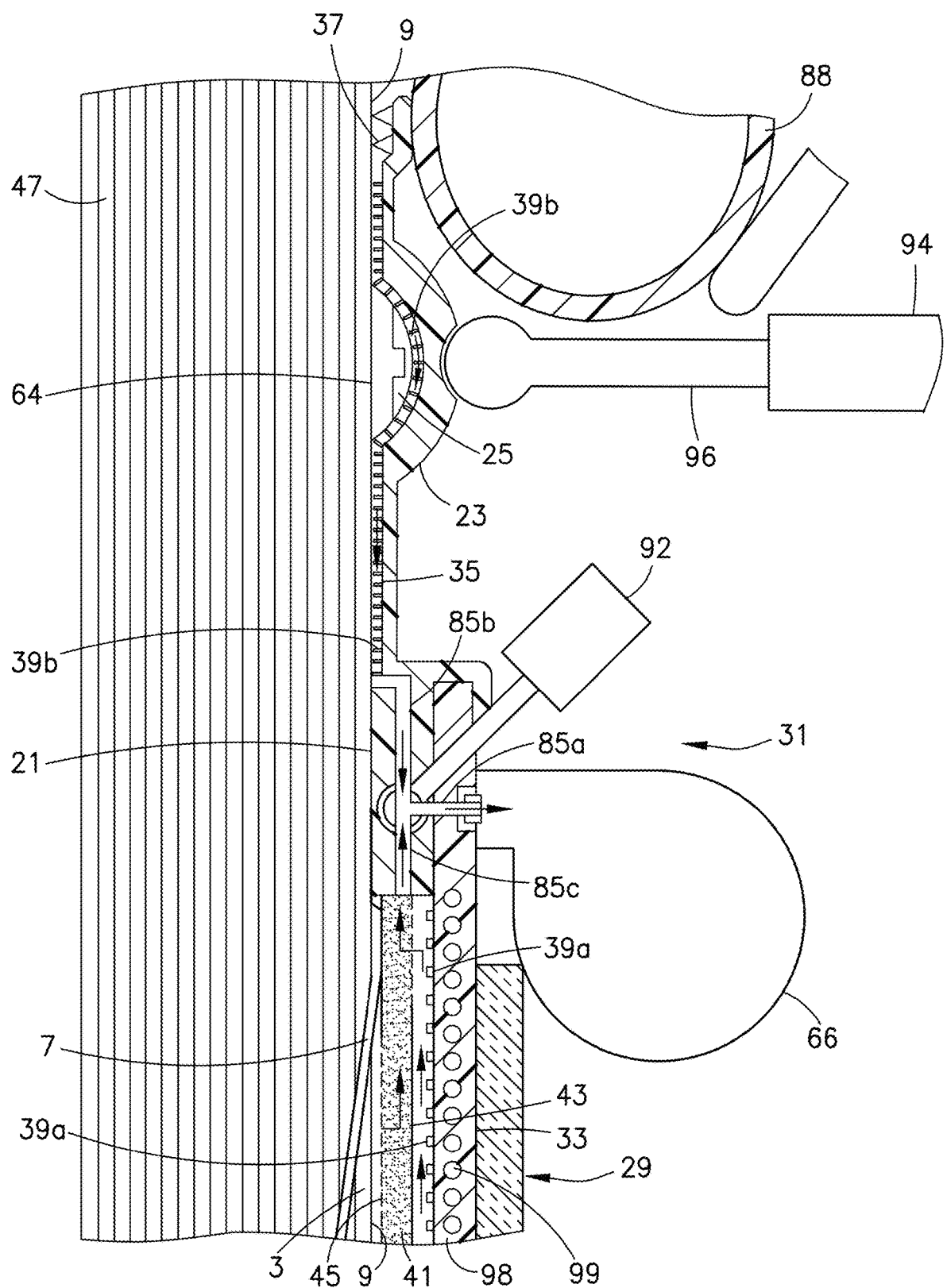
FIGS. 14A and 14B are diagrams representing further magnified views of respective portions of the repair patch ensemble in contact with the repair area as depicted in FIG. 13.
Figure 14B:
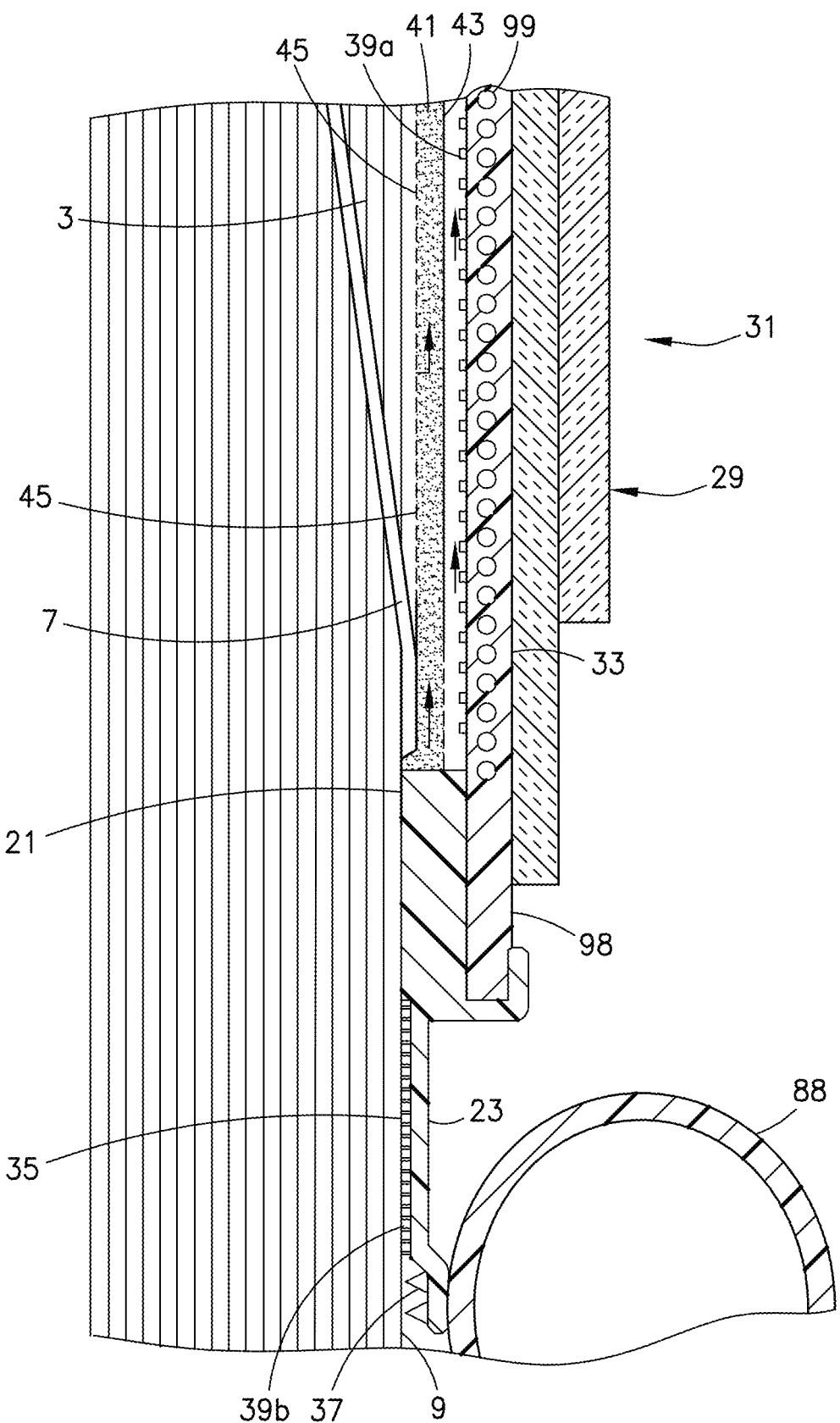

The patch applicator 31 further includes a vacuum bag 35 which is disposed on the surface of flexible flange 23 that faces toward surface 9. The vacuum bag 35 surrounds the heating blanket support frame 21. Magnified views of respective portions of vacuum bag 35 (disposed on opposite sides of the heating blanket support frame 21) are presented in FIGS. 14A and 14B, which diagrams represent further magnified views of respective portions of the repair patch ensemble in contact with the repair area 13 as depicted in FIG. 13. As seen in FIGS. 14A and 14B, the vacuum bag 35 has an embossed pattern 39b which creates a vacuum path for the outflow of air underneath the vacuum bag 35 in an area between heating blanket support frame 21 and edge seal 37. Producing a vacuum pressure in this area by partially evacuating the space between flexible flange 23 and surface 9 enables the patch applicator 31 to vacuum adhere to the surface 9.

The patch applicator 31 further includes a multiplicity of indexing post receivers which are arranged and configured to couple to the multiplicity of indexing posts 64 depicted in FIG. 4C. One such indexing post receiver 25 is shown in FIG. 14A. The indexing post receiver 25 may include a latch or gripper configured to couple with an indexing post 64 on the surface 9. The state of the indexing post receiver 25 is controlled by a process controller (not shown in FIGS. 12 and 13). In the state depicted in FIG. 12, the indexing post receiver 25 is open and ready to receive the indexing post 64. In the state depicted in FIG. 13, the indexing post receiver 25 is closed and latched onto the indexing post 64. As seen in FIG. 12, indexing post receiver 25 is attached to the distal end of a solenoid armature 96 of an electromechanical solenoid 94. The electromechanical solenoid 94 is coupled to and supported by the payload support frame 8. The patch applicator 31 includes a respective solenoid for each indexing post latch 25. As seen in FIG. 11B, the electromechanical solenoid 94 may be extended to enable the indexing post receiver 25 to contact the indexing post 64 before the other components of the repair patch ensemble contact the surface 9 (e.g., before repair patch 3 contacts repair area 13).

As best seen in FIGS. 14A and 14B, the patch applicator 31 further includes a layer of bleeder material 41 having a perimeter attached to the heating blanket support frame 21. The layer of bleeder material 41 is disposed in adjacent and parallel relationship to the heating blanket 33. The patch applicator 31 further includes a release film 43 having a perforated perimeter attached to the heating blanket support frame 21 and disposed between the heating blanket 33 and the layer of bleeder material 41. In addition, the patch applicator 31 includes a perforated release film 45 having a perimeter attached to the heating blanket support frame 21 and disposed in adjacent and parallel relationship to the layer of bleeder material 41. Thus, as seen in FIGS. 14A and 14B: the release film 43 is disposed between heating blanket 33 and bleeder material 41; the bleeder material 41 is disposed between release film 43 and perforated release film 45; and the perforated release film 45 is disposed between bleeder material 41 and repair patch 3. In addition, the surface of the thermally conductive matrix 98 of heating blanket 33 which faces the repair patch 3 has an embossed pattern 39a designed to facilitate the flow of air in the space between the heating blanket 33 and release film 43. The arrows in FIGS. 14A and 14B show respective flows of air through the embossed pattern 39a and through the layer of bleeder material 41 due to the vacuum pressure induced by the vacuum pump 66 during both the first and second vacuum valve modes. The spaces on opposite sides of the release film 43 are in flow communication via the perforations in the outer perimeter of the release film 43 (shown in FIG. 14A). The resulting vacuum pressure in the space between heating blanket 33 and repair patch 3 causes the repair patch 3 to effectively vacuum adhere to the heating blanket 33 (albeit with intervening bleeder material and release films), thereby enabling the UAV 2 to carry a repair patch 3 from a maintenance depot to a repair site.

As best seen in FIG. 14A, the heating blanket support frame 21 includes a first channel 85a which is connected to the vacuum pump 66, a second channel 85b which is in flow communication with the space underneath the vacuum bag 35, and a third channel 85c which is in flow communication with the space underneath the heating blanket 33 (hereinafter "channels 85a-85c"). The channels 85a-85c are selectively connectable via control valves which are included in the valve assembly 92. More specifically, during flight of the UAV 2, the control valves are set in accordance with a first vacuum valve mode in which the third channel 85c is connected to the first channel 85a to enable the vacuum pump 66 to generate a vacuum pressure in the space underneath the heating blanket 33 for the purpose of vacuum adhering the repair patch 3 to the heating blanket 33. In contrast, when the repair patch application apparatus is in the position seen in FIG. 11B, the control valves are set in accordance with a second vacuum valve mode in which not only is the third channel 85c connected to the first channel 85a, but the second channel 85b is also connected to the first channel 85a (and to the third channel 85c) to enable the vacuum pump 66 to generate a vacuum pressure in the space underneath the vacuum bag 35 for the purpose of vacuum adhering the flexible flange 23 of the patch applicator 31 to the surface 9.

Figure 15:
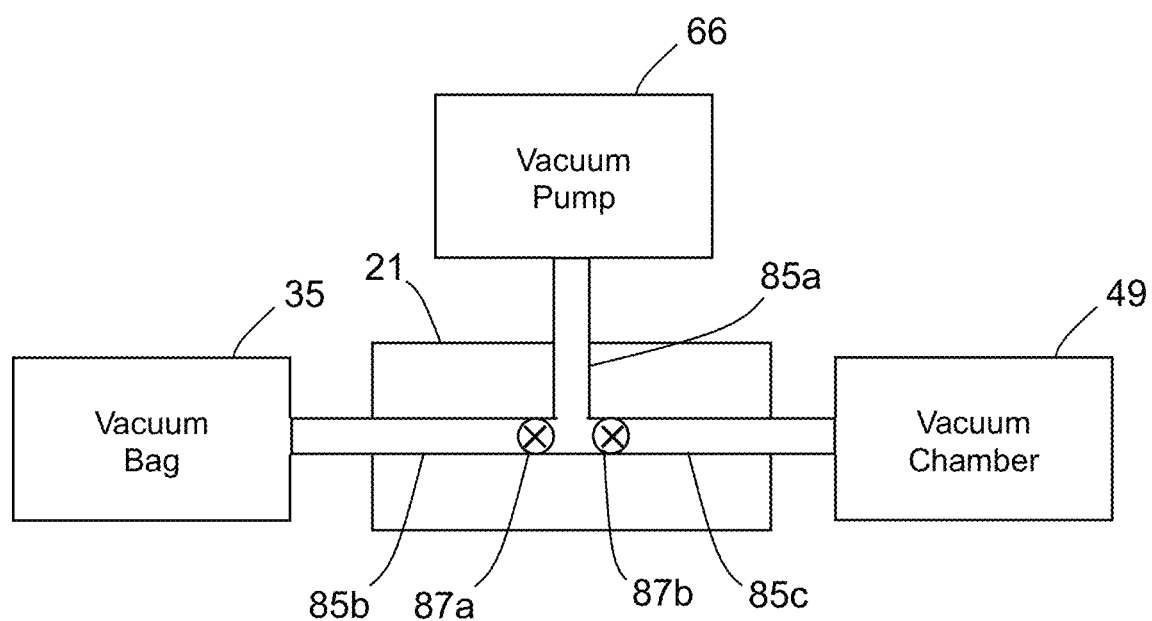
FIG. 15 is a block diagram identifying components of a subsystem for producing vacuum pressure that is used to vacuum adhere the repair patch to the patch applicator and vacuum adhere the patch applicator to the repairable surface.

FIG. 15 is a block diagram identifying components of a subsystem for in vacuum pressure that is used to both vacuum adhere the repair patch 3 to the patch applicator 31 and vacuum adhere the patch applicator 31 to surface 9 prior to curing in accordance with one proposed implementation. As previously described, the vacuum pressure-inducing subsystem includes a vacuum pump 66 in flow communication with channels 85a-85c formed in the heating blanket support frame 21. In addition, the vacuum pressure-inducing subsystem includes control valves 87a and 87b, which are components of the valve assembly 92 depicted in FIG. 14A. The vacuum pump 66 is in flow communication with a vacuum chamber 49 (i.e., the space between heating blanket 33 and repair 3) when the control valve 87b is open and is not in flow communication with a vacuum chamber 49 when the control valve 87b is closed. Similarly, the vacuum pump 66 is in flow communication with the vacuum path formed by the embossed pattern of the vacuum bag 35 when the control valve 87a is open and is not in flow communication with that vacuum path when the control valve 87a is closed. The control valve 87a is closed and the control valve 87b is open in the first vacuum valve mode; both control valves 87*a* and 87*b* are open in the second vacuum valve mode.

While the vacuum pressure-inducing subsystem is operating in the second vacuum valve mode, the heating blanket 33 is activated to apply heat sufficient to convert the adhesive film 7 into an adhesive bond sufficiently strong to hold the repair patch 3 in place on the repair area 13. More specifically, the heating blanket 33 is operated in accordance with a heating protocol designed to cure the adhesive film 7 and form a satisfactory adhesive bondline between repair patch 3 and repair area 13. During curing, the bondline may be held within a relatively narrow temperature range for a predetermined period of time in order to fully cure the adhesive. Furthermore, the entire area of the bondline may be held within the temperature range without substantial variation across the bondline.

The heating blanket 33 may comprise a power supply for generating alternating current having a frequency between 1 and 300 kHz and amperage between 1 and 1000 amps at a voltage of between 10 and 300 volts. Instead of a multiplicity of electrically resistive heating elements, heating blanket 99 may comprise an electrical conductor that extends in a meandering pattern through the thermally conductive matrix 98. The electrical conductor may receive alternating current from the power supply for generating an alternating magnetic field in response to the alternating current. The heating blanket 33 may comprise a susceptor sleeve formed of magnetic material having a Curie temperature and being coaxially mounted to the conductor and electrically insulated therefrom for induction heating in response to the magnetic field.

For example, one method for performing an automated hot bond repair process under remote control using the apparatus described above includes the following steps. First, a hot bond repair module including a patch applicator is coupled to a UAV at a maintenance depot. Then a repair patch is vacuum adhered to the patch applicator by producing a vacuum pressure between the repair patch and a heating blanket of the patch applicator. The UAV is then flown to the repair site and located so that the repair patch covers the repair area. While the patch applicator is vacuum adhered to the repairable surface, the repair patch is hot bonded to the repair area by supplying electric power to the heating blanket. Sufficient heat is applied to adhesively bond the repair patch to the repair area. Then the repair patch is released by the patch applicator by restoring ambient pressure between the repair patch and heating blanket. The UAV is then flown away from the surface of the repaired structure, leaving the repair patch in place.

Figure 16:
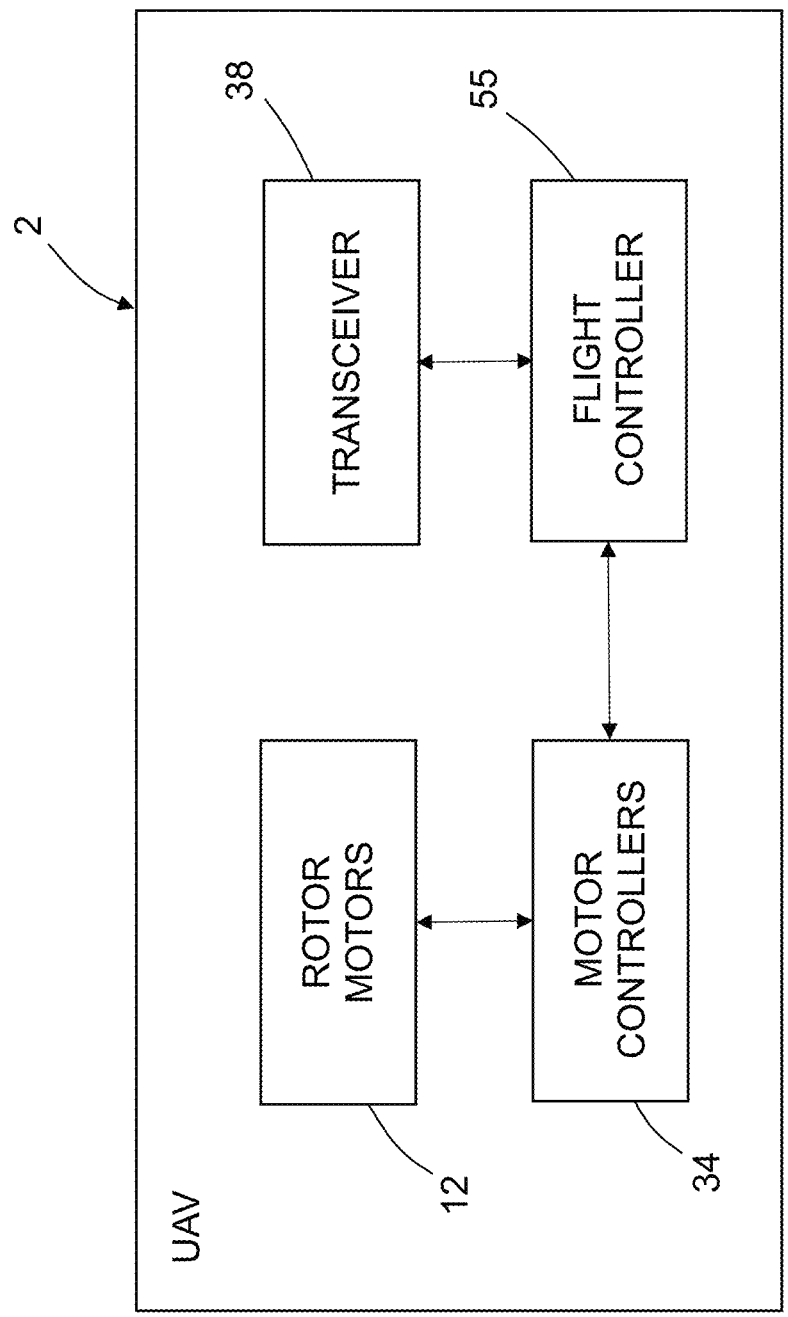
FIG. 16 is a block diagram identifying some components of a UAV.

FIG. 16 is a block diagram identifying some components of a UAV 2 which may be equipped to carry out one or more of the repair operations described herein under remote control. The UAV 2 includes a plurality of rotor motors (not shown in FIG. 16) which are controlled by respective motor controllers 34. The motor controllers 34 control the speed and direction of rotation of the rotors based on control signals received from a flight controller 55. The flight controller 55 is a computer configured to send control signals to the motor controllers 34 in accordance with commands received from a control station (not shown in FIG. 16, but see control station 40 in FIG. 10) via a transceiver 38. In accordance with one proposed implementation, the motor controllers 34 are electronic speed control circuits configured to vary an electric motor's speed, direction and braking, while the rotor motors 12 are brushless electric motors. Such electronic speed control circuits provide high-frequency, high-resolution three-phase AC power to the motors.

In accordance with some embodiments, the UAV-enabled repair system proposed herein also includes an off-board tracking system for vehicle and repair tool localization, which system may be communicatively coupled to the aforementioned control station 40 on the ground. More specifically, the off-board tracking system is configured to provide three-dimensional (3-D) localization information for navigation and control of the UAV relative to the target object and for accurately locating the inspection or repair tool in the frame of reference of the target object and correlating the location data with a 3-D model of the target object. Accurate location tracking for UAV-based repair will enable the UAV to move a repair module to the proper location and record the 3-D coordinate data associated with that location. This 3-D information is important for documenting the repair, as well as enabling accounting for the results of a previously performed UAV-enabled inspection. Any one of various techniques may be used to provide the information necessary to record the 3-D location of the activity.

In accordance with one embodiment, the UAV includes an onboard tracking system that is able to navigate the UAV in accordance with a preprogrammed flight plan. The preprogrammed flight plan carried by UAV enables the UAV to follow a flight path around a portion of the target object. The system further includes an off-board tracking system having means for wireless communication with the UAV. The off-board tracking system is configured to send commands to or monitor various operating performance parameters of the UAV, such as fuel remaining, battery power remaining, etc. The off-board tracking system may also be used generate commands to alter the flight path of the UAV based on acquired localization data.

In accordance with one embodiment, 3-D localization may be accomplished by placing optical targets on the UAV 2 and then using motion capture feedback control to calculate the location of the UAV 2. Closed-loop feedback control using motion capture systems is disclosed in detail in U.S. Pat. No. 7,643,893, the disclosure of which is incorporated by reference herein in its entirety. In accordance with one embodiment, the motion capture system is configured to measure one or more motion characteristics of the UAV 2 during a repair mission. A processor receives the measured motion characteristics from the motion capture system and determines a control signal based on the measured motion characteristics. A position control system receives the control signal and continuously adjusts at least one motion characteristic of the UAV 2 in order to maintain or achieve a desired motion state. The UAV 2 may be equipped with optical targets in the form of passive retro-reflective markers. The motion capture system, the processor, and the position control system comprise a complete closed-loop feedback control system.

In accordance with an alternative embodiment, location tracking of the UAV 2 may be implemented using a local positioning system (not shown in the drawings) mounted on or near the target object. The local positioning system may be controlled from the ground and used to track the location of a UAV 2 having three or more optical targets thereon. A typical local positioning system comprises: a pan-tilt mechanism; a camera mounted to the pan-tilt mechanism; and a laser range meter for projecting a laser beam along an aim direction vector to the target. The pan-tilt mechanism comprises a pan unit and a tilt unit. The camera comprises a housing to which the laser range meter is mounted. The camera may comprise a still camera (color and/or black and white) to obtain still images, a video camera to obtain color and/or black and white video, or an infrared camera to obtain infrared still images or infrared video of the target. The local positioning system further comprises a computer system which is configured to measure coordinates of the optical targets in the local coordinate system of the target object. In particular, this computer system is programmed to control motions of the pan-tilt mechanism to rotationally adjust the camera to selected angles around the vertical, azimuth (pan) axis and the horizontal, elevation (tilt) axis. The computer system is also programmed to control operation of the camera and receive image data therefrom for transmission to the control station 40. The computer system is further programmed to control operation of the laser range meter and receive range data therefrom for transmission to the control station 40. The local positioning system may further comprise a wireless transceiver and an antenna to enable bidirectional, wireless electromagnetic wave communications with a control station. The local positioning system preferably has the capabilities described in U.S. Pat. Nos. 7,859,655, 9,285,296, and 8,447,805 and U.S. Patent Application Pub. No. 2018/0120196, the disclosures of which are incorporated by reference herein in their entireties. The image data acquired by the video camera of the local positioning system may undergo image processing as disclosed in U.S. Pat. No. 8,744,133.

An alternative 3-D localization approach involves placing two or more UAV-placed visible targets, such as ink marks, adjacent to the repair area. The marks would be used by the UAV to accurately re-orient itself to the repair during each successive repair operation. Automated video localization equipment would be employed to re-orient the UAV to the repair area using the usable marks.

While methods and apparatus for performing a hot bond repair of a target object using a tool-equipped UAV have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used in the claims, the term "controller" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit. For example, the term "controller" includes, but is not limited to, a small computer on an integrated circuit containing a processor core, memory and programmable input/output peripherals.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the specification explicitly disclaims or logic implicitly precludes such an interpretation.

The invention claimed is:

1. An apparatus comprising:
an unmanned aerial vehicle comprising a body frame, a plurality of rotor motors mounted to the body frame, and a plurality of rotors operatively coupled to respective rotor motors of the plurality of rotor motors;
a payload support frame pivotably coupled to the body frame of the unmanned aerial vehicle; and
a patch applicator comprising a heating blanket support frame coupled to the payload support frame, a heating blanket having a perimeter attached to the heating blanket support frame, and an inflatable bladder that is attached to the patch applicator and to the payload support frame.

2. The apparatus as recited in claim 1, wherein the heating blanket comprises a thermally conductive matrix and a multiplicity of electrically resistive heating elements embedded in the thermally conductive matrix.

3. The apparatus as recited in claim 2, wherein the thermally conductive matrix comprises an embossed pattern.

4. An apparatus comprising:
an unmanned aerial vehicle comprising a body frame, a plurality of rotor motors mounted to the body frame, and a plurality of rotors operatively coupled to respective rotor motors of the plurality of rotor motors;
a payload support frame pivotably coupled to the body frame of the unmanned aerial vehicle; and
a patch applicator comprising:
a heating blanket support frame coupled to the payload support frame;
a heating blanket having a perimeter attached to the heating blanket support frame;
a bleeder material having a perimeter attached to the heating blanket support frame and disposed in adjacent and parallel relationship to the heating blanket;
a release film having a perimeter attached to the heating blanket support frame and disposed between the heating blanket and the bleeder material; and
a perforated release film having a perimeter attached to the heating blanket support frame and disposed in adjacent and parallel relationship to the bleeder material.

5. The apparatus as recited in claim 4, further comprising an inflatable bladder that is attached to the patch applicator and to the payload support frame.

6. The apparatus as recited in claim 5, further comprising a rotor rotatably coupled to the payload support frame and configured to produce a thrust force that presses the inflatable bladder against a surface of a target object.

7. The apparatus as recited in claim 5, wherein the patch applicator further comprises:
a flexible flange having an inner perimeter attached to or integrally formed with the heating blanket support frame and an outer perimeter attached to the inflatable bladder; and
an edge seal integrally formed with the outer perimeter of the flexible flange.

8. The apparatus as recited in claim 7, wherein the patch applicator further comprises a vacuum bag that is attached to a portion of the flexible flange between the inner and outer perimeters of the flexible flange and comprises an embossed pattern.

9. The apparatus as recited in claim 8, wherein:
the patch applicator further comprises a vacuum pump attached to the heating blanket support frame and first and second control valves disposed inside the heating blanket support frame;
the heating blanket support frame comprises first, second and third channels that are connectable via the control valves;
the first channel is connected to the vacuum pump;
the second channel is connected to the first channel when the first control valve is open and is not connected to the first channel when the first control valve is closed; and
the third channel is connected to the first channel when the second control valve is open and is not connected to the first channel when the second control valve is closed.

10. The apparatus as recited in claim 1, further comprising a linear actuator having one end pivotably coupled to the body frame of the unmanned aerial vehicle and another end pivotably coupled to the payload support frame.

11. The apparatus as recited in claim 1, wherein the patch applicator further comprises:
a flexible flange having an inner perimeter attached to or integrally formed with the heating blanket support frame and an outer perimeter attached to the inflatable bladder; and
an edge seal integrally formed with the outer perimeter of the flexible flange.

12. The apparatus as recited in claim 11, wherein the patch applicator further comprises a vacuum bag that is attached to a portion of the flexible flange between the inner and outer perimeters of the flexible flange and comprises an embossed pattern.

13. The apparatus as recited in claim 12, wherein:
the patch applicator further comprises a vacuum pump attached to the heating blanket support frame and first and second control valves disposed inside the heating blanket support frame;
the heating blanket support frame comprises first, second and third channels that are connectable via the control valves;
the first channel is connected to the vacuum pump;
the second channel is connected to the first channel when the first control valve is open and is not connected to the first channel when the first control valve is closed; and
the third channel is connected to the first channel when the second control valve is open and is not connected to the first channel when the second control valve is closed.

14. A method for repairing a structure using an unmanned aerial vehicle, the method comprising:
(a) coupling a patch applicator to a payload support frame;
(b) pivotably coupling the payload support frame to a body frame of a first unmanned aerial vehicle;
(c) vacuum adhering a repair patch to the patch applicator with adhesive film on the repair patch facing away from the patch applicator;
(d) flying the first unmanned aerial vehicle to a location where the adhesive film on the repair patch contacts a repair area on a surface of the structure; and
(e) applying heat sufficient to convert the adhesive film into an adhesive bond sufficiently strong to bond the repair patch to the repair area on the surface of the structure; and (f) vacuum adhering a flexible flange of the patch applicator to the surface of the structure in a region surrounding the repair area,
wherein step (f) is performed subsequent to step (d) and prior to step (e).

15. The method as recited in claim 14, further comprising:
(g) adhering a plurality of indexing posts to the surface of the structure prior to step (d) at positions outside the repair area using a second unmanned aerial vehicle;
(h) seating a plurality of indexing post receivers of the patch applicator on the plurality of indexing posts in a one-to-one relationship during step (d); and
(i) coupling the indexing post receivers to the indexing posts subsequent to step (h).

16. The method as recited in claim 15, further comprising drying the repair area subsequent to step (g) and prior to step (h) using a third unmanned aerial vehicle.

17. A method for repairing a structure using an unmanned aerial vehicle, the method comprising:
(a) vacuum adhering a surrogate patch to the patch applicator;
(b) flying the first unmanned aerial vehicle to the location on the surface of the structure;
(c) applying heat to the surrogate patch;
(d) measuring a thermal profile of the surrogate patch;
(e) coupling a patch applicator to a payload support frame;
(f) pivotably coupling the payload support frame to a body frame of a first unmanned aerial vehicle;
(g) vacuum adhering a repair patch to the patch applicator with adhesive film on the repair patch facing away from the patch applicator;
(h) flying the first unmanned aerial vehicle to a location where the adhesive film on the repair patch contacts a repair area on a surface of the structure; and
(i) applying heat sufficient to convert the adhesive film into an adhesive bond sufficiently strong to bond the repair patch to the repair area on the surface of the structure,
wherein steps (a) through (d) are performed prior to steps (e) through (i).

18. An apparatus comprising an unmanned aerial vehicle and an indexing post placement module coupled to the unmanned aerial vehicle,
wherein the unmanned aerial vehicle comprises:
a body frame;
a plurality of rotor motors mounted to the body frame; and
a plurality of rotors operatively coupled to respective rotor motors of the plurality of rotor motors, and
wherein the indexing post placement module comprises:
a spacer bar attached to the body frame of the unmanned aerial vehicle;
a first indexing post holder attached to or integrally formed with one end of the spacer bar and comprising a latch and a channel;
a first vacuum pump mounted to the spacer bar and in flow communication with the channel of the first indexing post holder;
a second indexing post holder attached to or integrally formed with another end of the spacer bar and comprising a latch and a channel; and
a second vacuum pump mounted to the spacer bar and in flow communication with the channel of the second indexing post holder.

19. A method for repairing a surface area of a structure using unmanned aerial vehicles, the method comprising:

(a) releasably coupling first and second indexing posts to an indexing post placement module;
(b) coupling the indexing post placement module to a first unmanned aerial vehicle;
(c) flying the first unmanned aerial vehicle to a location where the first and second indexing posts contact the surface of the structure at respective positions outside of an area to be repaired;
(d) adhering the first and second indexing posts to the surface of the structure at the respective positions;
(e) decoupling the first and second indexing posts from the indexing post placement module;
(f) flying the first unmanned aerial vehicle with the indexing post placement module away from the surface of the structure; and
(g) placing a cover sheet on the surface of the structure by fitting one end of a cover sheet rod on the first indexing post and fitting another end of the cover sheet rod on the second indexing post using a second unmanned aerial vehicle.

20. The method as recited in claim 19, further comprising:
(h) coupling a surface preparation module to a third unmanned aerial vehicle;
(i) flying the third unmanned aerial vehicle to a location where the surface preparation module is adjacent to the area to be repaired;
(j) preparing the surface of the structure in the area to be repaired using the surface preparation module; and
(k) flying the third unmanned aerial vehicle with the surface preparation module away from the surface of the structure.

21. The method as recited in claim 20, further comprising:
(l) coupling a hot bond repair module to a fourth unmanned aerial vehicle;
(m) releasably adhering a repair patch to the hot bond repair module;
(n) flying the fourth unmanned aerial vehicle to a location where the repair patch covers the area to be repaired;
(o) bonding the repair patch to the area to be repaired;
(p) releasing the repair patch from the hot bond repair module; and
(q) flying the fourth unmanned aerial vehicle with hot bond repair module away from the surface of the structure.

\* \* \* \* \*